(12) United States Patent
Gagliardoni

(10) Patent No.: US 12,206,768 B2
(45) Date of Patent: **\*Jan. 21, 2025**

(54) DISTRIBUTED ANONYMIZED COMPLIANT ENCRYPTION MANAGEMENT SYSTEM

(71) Applicant: Nagravision Sàrl, Cheseaux-sur-Lausanne (CH)

(72) Inventor: Tommaso Gagliardoni, Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,244

(22) Filed: Aug. 28, 2023

(65) Prior Publication Data

US 2024/0048367 A1 Feb. 8, 2024

Related U.S. Application Data

(63) Continuation of application No. 16/900,391, filed on Jun. 12, 2020, now Pat. No. 11,777,720.

(51) Int. Cl.
*H04L 29/06* (2006.01)
*H04L 9/08* (2006.01)
(Continued)

(52) U.S. Cl.
CPC ............ *H04L 9/085* (2013.01); *H04L 9/3268* (2013.01); *H04L 63/0421* (2013.01); *H04L 63/0428* (2013.01); *H04L 9/50* (2022.05)

(58) Field of Classification Search
None
See application file for complete search history.

(56) References Cited

U.S. PATENT DOCUMENTS

| 5,638,447 A | 6/1997 | Micali |
| 5,675,649 A | 10/1997 | Brennan et al. |

(Continued)

FOREIGN PATENT DOCUMENTS

| EP | 3 556 045 A1 | 10/2019 |
| WO | WO 2018/109010 A1 | 6/2018 |
| WO | WO 2019/229257 A1 | 12/2019 |

OTHER PUBLICATIONS

International Search Report and Written Opinion issued Sep. 21, 2021 in PCT/IB2021/000367.

*Primary Examiner* — Maung T Lwin
(74) *Attorney, Agent, or Firm* — Oblon, McClelland, Maier & Neustadt, L.L.P.

(57) ABSTRACT

A method for data security implemented as an application on a device includes generating a request for one or more secret shares needed to reconstruct a key. The device stores a first secret share in its memory. The method also includes signing the request with a certificate that identifies the request as valid without identifying the device, and sending the request, signed with the certificate, to at least one other device. The method further includes receiving, from the at least one other device, the one or more secret shares, determining whether the one or more secret shares received from the at least one other device is sufficient to reconstruct the key, and reconstructing the key using the first secret share and the one or more secret shares upon determining that the one or more secret shares are sufficient to reconstruct the key.

20 Claims, 31 Drawing Sheets

(51) Int. Cl.
*H04L 9/32* (2006.01)
*H04L 9/40* (2022.01)
*H04L 9/00* (2022.01)

(56) References Cited

U.S. PATENT DOCUMENTS

| | | | |
|---|---|---|---|
| 5,764,767 A | 6/1998 | Beimel et al. | |
| 6,952,475 B1 | 10/2005 | Horn | |
| 6,952,769 B1 * | 10/2005 | Dubey | H04L 67/14 |
| | | | 713/153 |
| 7,958,354 B1 | 6/2011 | Davis | |
| 8,316,237 B1 * | 11/2012 | Felsher | H04L 63/061 |
| | | | 380/282 |
| 8,407,475 B2 * | 3/2013 | Ganesan | H04L 9/0825 |
| | | | 713/168 |
| 8,566,247 B1 | 10/2013 | Nagel | |
| 8,924,728 B2 * | 12/2014 | Brickell | H04L 9/3271 |
| | | | 713/168 |
| 8,989,390 B2 | 3/2015 | Gantman | |
| 9,442,980 B1 * | 9/2016 | Trepetin | G06F 16/2455 |
| 9,774,578 B1 | 9/2017 | Ateniese et al. | |
| 10,735,205 B1 * | 8/2020 | Wentz | H04L 9/3257 |
| 11,057,210 B1 | 7/2021 | Sierra | |
| 11,582,221 B1 | 2/2023 | Raj | |
| 2003/0048906 A1 * | 3/2003 | Vora | H04L 9/085 |
| | | | 380/277 |
| 2004/0030932 A1 | 2/2004 | Juels | |
| 2004/0103276 A1 | 5/2004 | Jing | |
| 2004/0255137 A1 * | 12/2004 | Ying | H04L 63/0884 |
| | | | 713/193 |
| 2007/0143608 A1 | 6/2007 | Zeng et al. | |
| 2007/0154014 A1 * | 7/2007 | Aissi | G06F 21/445 |
| | | | 380/46 |
| 2009/0254750 A1 | 10/2009 | Bono | |
| 2010/0037293 A1 | 2/2010 | St Johns | |
| 2010/0235588 A1 | 9/2010 | Maeda | |
| 2011/0099379 A1 | 4/2011 | Ganesan | |
| 2012/0102318 A1 | 4/2012 | Vanstone | |
| 2013/0073860 A1 * | 3/2013 | Ibraimi | H04L 9/085 |
| | | | 713/176 |
| 2013/0227279 A1 | 8/2013 | Quinlan | |
| 2014/0101440 A1 * | 4/2014 | Hermoni | H04L 9/3218 |
| | | | 713/156 |
| 2014/0195809 A1 | 7/2014 | Solow | |
| 2018/0019993 A1 * | 1/2018 | Kravitz | G06F 21/64 |
| 2019/0036957 A1 | 1/2019 | Smith | |
| 2019/0158481 A1 * | 5/2019 | Ronda | H04L 63/0428 |
| 2019/0215165 A1 | 7/2019 | Simplicio, Jr. et al. | |
| 2019/0238311 A1 | 8/2019 | Zheng | |
| 2019/0251558 A1 * | 8/2019 | Liu | G06Q 20/389 |
| 2019/0333054 A1 * | 10/2019 | Cona | H04W 12/06 |
| 2020/0153627 A1 | 5/2020 | Wentz | |
| 2020/0162251 A1 | 5/2020 | Wentz | |
| 2020/0259799 A1 | 8/2020 | Li | |
| 2020/0336470 A1 | 10/2020 | Kravitz | |
| 2021/0374234 A1 | 12/2021 | Bursell | |

\* cited by examiner

DISTRIBUTED ANONYMIZED COMPLIANT ENCRYPTION MANAGEMENT SYSTEM

CROSS-REFERENCE TO RELATED APPLICATIONS

This application is a continuation of U.S. application Ser. No. 16/900,391, filed Jun. 12, 2020, the entire content of which is incorporated herein by reference.

BACKGROUND

Field of the Invention

The present disclosure relates to encryption management systems and associated methodologies for securing data using cryptographic keys that can be reconstructed from shares held by separate key managers.

Description of the Related Art

Data owners may want to store sensitive data in remote locations, such as on cloud storage or a digital corporate safe. Such data can be extremely sensitive, and should only be accessed by authorized entities even in the event of the disappearance of the data owner. Examples, of such data include cryptocurrency or data collected by an Internet-of-things device.

To facilitate access to the data, typical encryption systems generate a digital key that the data owner can use to decrypt the data. These systems can also generate secret shares that can be used to reconstruct the digital key, and distribute the secret shares to several key managers. Thus, even in the event of disappearance of the digital key, the data can be accessed by reconstructing the digital key if a sufficient number of secret shares are recombined. This may be less than all of the outstanding secret shares. Since each secret share is held by a different key manager, a sufficient number of key managers must agree that the conditions warrant reconstruction of the key in order to assemble the sufficient number of secret shares.

However, in typical encryption systems that rely on secret shares, key managers know each other's identities. Thus, these systems are vulnerable to unauthorized reconstruction of the digital key through the collusion of several key managers in order to reconstruct the key from their secret shares. Therefore, an encryption management system is needed to address these and other deficiencies of current systems.

SUMMARY

The present disclosure describes an encryption management system that solves the problems in conventional encryption management systems. Specifically, the present disclosure describes an encryption management system with the following features.

In an exemplary aspect of the present disclosure, a method for data security implemented as an application on a device includes generating a request for one or more secret shares needed to reconstruct a key, the device storing a first secret share in a memory thereof, signing the request with a certificate that identifies the request as valid without identifying the device, and sending the request, signed with the certificate, to at least one other device. The method also includes receiving, from the at least one other device, the one or more secret shares, determining whether the one or more secret shares received from the at least one other device is sufficient to reconstruct the key, and reconstructing the key using the first secret share and the one or more secret shares upon determining that the one or more secret shares are sufficient to reconstruct the key.

Because the certificate in the request sent by the device does not identify the device, the device remains anonymous to the other device(s) that receive the request. Therefore, devices that hold secret shares, and their owners, do not know each other's identities making it more difficult to collude to illegitimately reconstruct the key and access the data. Maintaining the identities of the devices, and therefore the identities of their owners, secret also safeguards the secret share holders from attempts steal their secret shares or coerce them into providing their secret shares or reconstructing the key.

In an exemplary aspect of the disclosure, the method also includes retrieving encrypted data from a data storage device using the key.

In an exemplary aspect of the disclosure, the retrieving of the data includes decrypting the data with the key.

In an exemplary aspect of the disclosure, the device sends the request to the at least one other device by uploading the request to a distributed ledger.

In an exemplary aspect of the disclosure, the device anonymously uploads the request to the distributed ledger. For example, the device uploads the request to the distributed ledger using Tor to remain anonymous. This protects the secret share holders, as discussed above, from attempts to coerce them into providing their secret share, reconstructing the key, or accessing the encrypted data.

In an exemplary aspect of the disclosure, the distributed ledger is a block chain. Each entry in a block chain includes a hash value based on the previous entry, which renders the block chain resistant to modification of the data written therein.

In an exemplary aspect of the disclosure, the device receives the one or more secret shares by downloading the one or more secret shares from the distributed ledger.

In an exemplary aspect of the disclosure, the method further includes receiving the first secret share from a server that manages the secret shares and the key, and receiving the certificate from a server that manages certificates of devices holding secret shares.

In an exemplary aspect of the present disclosure, the one or more secret shares received by the device include one or more signatures based on one or more certificates of one or more devices from which the one or more secret shares are received.

In an exemplary aspect of the present disclosure, the method further includes validating the one or more secret shares received based on the one or more signatures included therein. As noted above, the certificates of the devices do not identify the devices themselves. Therefore, the signatures, which are based on the devices, do not identify the devices thus allowing them to remain anonymous. Validation is based on, for example, a pseudonym included in the certificate, an issuing authority of the certificate, and the like. This advantageously safeguards the devices, and their owners from potential coercive attempts, and also reduces the possibility that two or more secret share holders will attempt to collude to reconstruct the key and gain access to the encrypted data without authority.

In an exemplary aspect of the present disclosure, as part of the validating, the method further includes querying a server that manages device certificates to determine whether the one or more signatures included in the one or more secret shares are valid.

In an exemplary aspect of the present disclosure, as part of the validating, the method further includes determining validity of the one or more secret shares based on a list obtained from a distributed ledger and the one or more signatures included in the one or more secret shares.

In an exemplary aspect of the present disclosure, the method further includes receiving a request from another device, validating the request based on internal policies of the device, and sending the first secret share to the other device when the request is determined to be valid.

In an exemplary aspect of the present disclosure, the method further includes using regional information to validate the request, and determining the request to be invalid if the regional information indicates that the other device is not in a region where data encrypted by the key can be accessed. For example, requests originating from countries and/or organizations that do not comply with the General Data Protection Regulation (GDPR) may be denied by a particular device if that device resides in a country that requires (GDPR) compliance.

In an exemplary aspect of the present disclosure, the list is a certificate revocation list, and the device determines the request to be invalid if a certificate with which the request is signed is indicated as invalid in the certificate revocation list. The revocation list advantageously allows an issuing authority of the certificates to revoke certificates of rogue secret share holders that attempt to recover the key without authority or that launch an attack on the system (such as a denial of service attack). Once the issuing authority identifies the rogue secret share holder, a corresponding certificate may be revoked on the list, resulting in denial of any requests for secret shares made by the rogue secret share holder.

In an exemplary aspect of the present disclosure, a method implemented by software executed on a processor of a device, includes receiving information pertaining to one or more devices, generating one or more certificates for the one or more devices based on the information pertaining to the one or more devices, the one or more certificates not indicating identities of the one or more devices, and distributing the one or more certificates to the one or more devices.

In an exemplary aspect of the present disclosure, the method also includes maintaining regional information pertaining to the one or more devices, and providing the regional information to the one or more devices.

In an exemplary aspect of the present disclosure, the providing of the regional information includes uploading the regional information to a distributed ledger.

In an exemplary aspect of the present disclosure, the method further includes maintaining a certificate revocation list indicating a revocation status of the one or more certificates distributed to the one or more devices, and providing the certificate revocation list to the one or more devices.

In an exemplary aspect of the present disclosure, the providing of the certificate revocation list to the one or more devices includes uploading the certificate revocation list to a distributed ledger.

In an exemplary aspect of the present disclosure, the method further includes receiving an indication that a regional authority has obtained the key.

In an exemplary aspect of the present disclosure, a device includes circuitry including at least a processor coupled to a memory that stores computer-readable instructions that, when executed by the processor, cause the processor to receive a first secret share used to reconstruct, in combination with other secret shares, a key that provides access to encrypted data, and receive a certificate used to validate communications by the device without disclosing an identity of the device. The processor also generates a request for one or more secret shares from other devices, signs the request with the certificate, sends the request to the other devices, receives the one or more secret shares in response to the request, and reconstructs the key with the one or more secret shares received and the first secrete share when a number of the one or more secret shares received is sufficient to reconstruct the key.

As can be appreciated, the encrypted data can be sensitive data that is to be accessed only under specific conditions, such as in the event of a natural disaster, pandemic, war, financial crisis, and the like. Access to the data may also be authorized in the event of the disappearance of the data owner. The encrypted data itself may include information needed to access funds (e.g., bank account information, stocks and bonds information, etc.) or may be classified information necessary to carry out a particular task required by the conditions under which the data is to be accessed. The encrypted data can also include cryptocurrency, as one of ordinary skill would recognize.

In an exemplary aspect of the present disclosure, the processor sends the request by uploading the request to a distributed ledger. Using a distributed ledger for communication advantageously safeguards the data written thereto from tampering and/or alternation. The distributed ledger also facilitates device-to-device communication, such as in Internet of Things (IoT) application, and one of ordinary skill would recognize.

In an exemplary aspect of the present disclosure, the processor receives the one or more secret shares by downloading the one or more secret shares from a distributed ledger.

In an exemplary aspect of the present disclosure, the processor uploads the request to the distributed ledger anonymously.

In an exemplary aspect of the present disclosure, the processor downloads the one or more secret shares from the distributed ledger without determining identities of one or more devices corresponding thereto.

In an exemplary aspect of the present disclosure, the processor further receives a request from another device, validates the request based on internal policies of the device, and sends the first secret share to the other device when the request is determined to be valid.

In an exemplary aspect of the present disclosure, the processor uses regional information in validating the request, and determines the request to be invalid if the regional information indicates that the other device is not in a region where data encrypted by the key can be accessed.

In an exemplary aspect of the present disclosure, the device uses a certificate revocation list in validating the request, and determines the request to be invalid if a certificate with which the request is signed is indicated as invalid in the certificate revocation list.

In an exemplary aspect of the present disclosure, the processor receives an indication that the key has been obtained by a regional authority.

In an exemplary aspect of the present disclosure, a device includes circuitry including at least a processor coupled to a memory that stores computer-readable instructions that, when executed by the processor, cause the processor to receive information pertaining to one or more devices, generate one or more certificates for the one or more devices based on the information pertaining to the one or more devices, the one or more certificates not indicating identities of the one or more devices, and distribute the one or more certificates to the one or more devices.

In an exemplary aspect of the present disclosure, the processor maintains regional information pertaining to the one or more devices, and provides the regional information to the one or more devices.

In an exemplary aspect of the present disclosure, the processor provides the regional information to the one or more devices by uploading the regional information to a distributed ledger.

In an exemplary aspect of the present disclosure, the processor maintains a certificate revocation list indicating a revocation status of the one or more certificates distributed to the one or more devices, and provides the certificate revocation list to the one or more devices.

In an exemplary aspect of the present disclosure, the processor provides the certificate revocation list to the one or more devices by uploading the certificate revocation list to a distributed ledger.

In an exemplary aspect of the present disclosure, the processor receives an indication that a regional authority has obtained the key.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
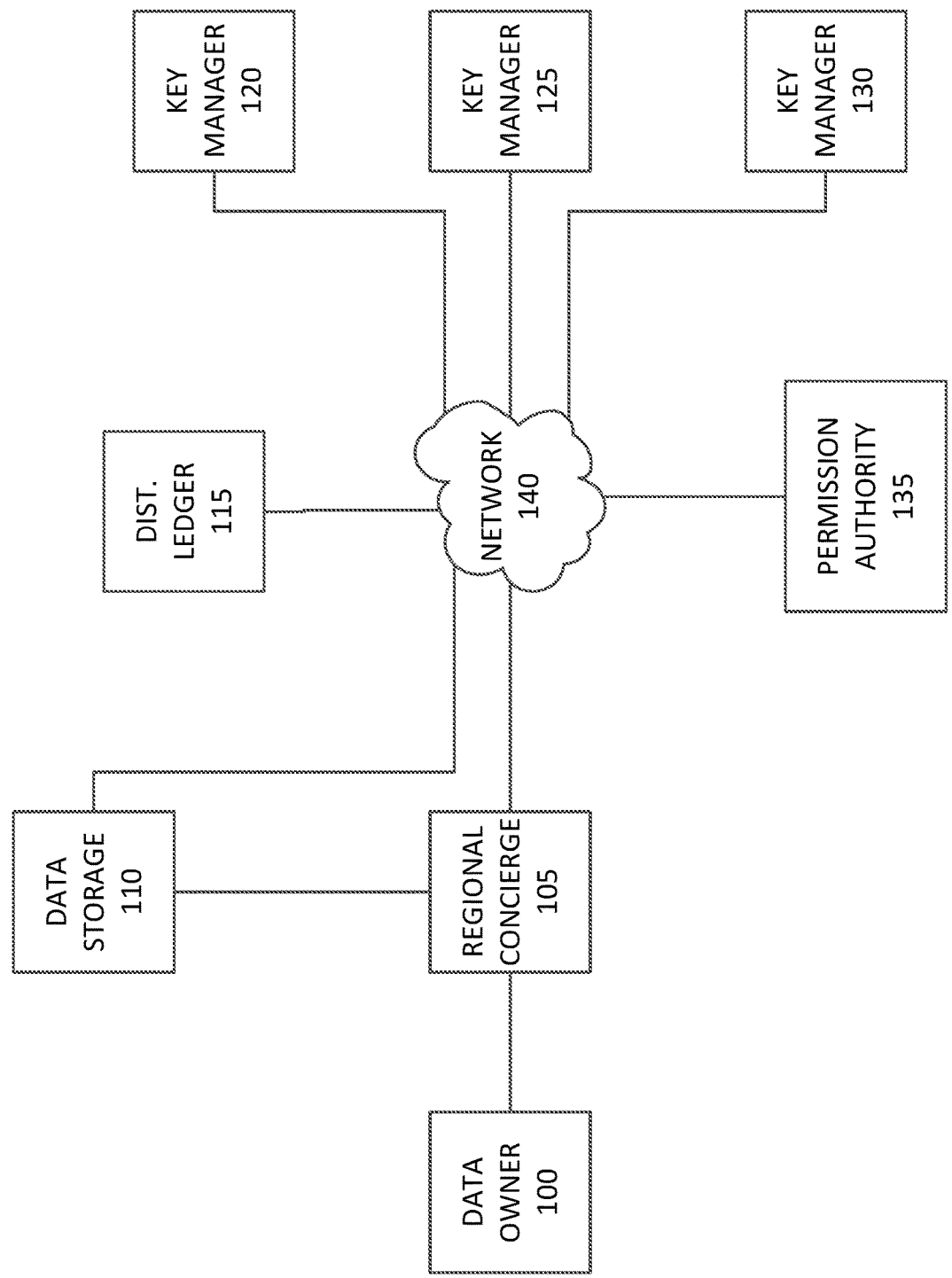
FIG. 1 is a block diagram of an encryption management system according to exemplary aspects of the present disclosure.

Referring now to the drawings, wherein like reference numerals designate identical or corresponding parts throughout the several views, FIG. 1 is a block diagram that provides an overview of an encryption management system according to exemplary aspects of the present disclosure. In FIG. 1, the data owner 100 has data to be securely stored. The data owner 100 is connected to a regional concierge 105 that receives the data from the data owner 100, encrypts the data using an encryption key, and transfers the encrypted data to a data storage 110. Once stored in the data storage 110, the encrypted data can only be retrieved by an entity having the encryption key. Further details regarding the encryption and safeguarding of the data are provided below.

Both the data storage 110 and the regional concierge are connected to a network 140, which can be a public network such as the Internet. Also connected to the network 140 are a permission authority 135, a distributed ledger 115 (e.g., a block chain), and a plurality of key managers 120, 125, and 130. As explained in greater detail below, the permission authority 135 authenticates each of the key managers 120, 125, and 130 by, for example, providing these entities with certificates, and the distributed ledger 115 is used by the key managers 120, 125, and 130 to communicate amongst themselves and the permission authority.

As can be appreciated the distributed ledger 115, such as a block chain, may be a growing list of records in which each new record, or block, includes a cryptographic has of the previous record, or block. Such distributed ledgers may be managed by a peer-to-peer network where alteration of a record requires alteration of all previous records, because of the cryptographic hash embedded therein, and therefor requires consensus of all of the peers. Some distributed ledgers may support smart contracts, which digitally facilitate the performance of a contract. For example, a smart contract may be used to provide a certain piece of information to a party once that party has demonstrated that a specific condition has been satisfied. Of course, other distributed ledgers are also possible without departing from the scope of the present disclosure.

As previously described, the regional concierge 105 encrypts the data from the data owner 100 using an encryption key. The regional concierge 105 may then generate secret shares from the encryptions key and distribute the secret shares to the key managers 120, 125, and 130. Each of the secret shares, on its own, is insufficient to recover the encryption key. Therefore, none of the key managers 120, 125, and 130 may recover the encryption key without obtaining the secret shares of at least one other key manager 120, 125, 130, which adds an extra measure of security since more than one key manager 120, 125, 130 must agree that access to the encrypted data in the data storage 110 is warranted in order to combine a sufficient amount of secret shares to recover the key.

As can be appreciated, the regional concierge 105 may generate N secret shares and distribute the N secret shares to N key managers. However, recovery of the encryption key may require only M secret shares, where M<N. Thus, only a subset of the key managers 120, 125, 130 of FIG. 1 may need to combine their secret shares in order to recover the key. To recover the encryption key, key managers 120, 125, 130 generate key requests and send the key requests to the other key managers 120, 125, 130 via the distributed ledger 115, as will be explained in greater detail below. If sufficient secret shares are received in response to a key request, the requesting key manager 120, 125, 130 is able to recover the encryption key and access the encrypted data stored in the data storage 110.

FIG. 1 illustrates three key managers 120, 125, 130. However, this is only for the sake of clarity since in practice there may be many more than three key managers. Furthermore, FIG. 1 illustrates each of the data owner 100, the regional concierge 105, the data storage 110, the distributed ledger 115, the key managers 120, 125, 130, and the permission authority 135 as separate entities. However, this is only for the sake of clarity. As such, the different blocks illustrated in FIG. 1 may be separate, independent entities, or may form part of a single entity without limitation.

Each of the blocks illustrated in FIG. 1 may be a single device, such as a computer, laptop computer, tablet computer, mobile phone, or the like; or each of the blocks illustrated in FIG. 1 may itself be a system including several different devices, such as computers, servers, etc., interconnected by a network. Therefore, the specific makeup of the blocks illustrated in FIG. 1 is not limiting upon the present disclosure.

Figure 2:
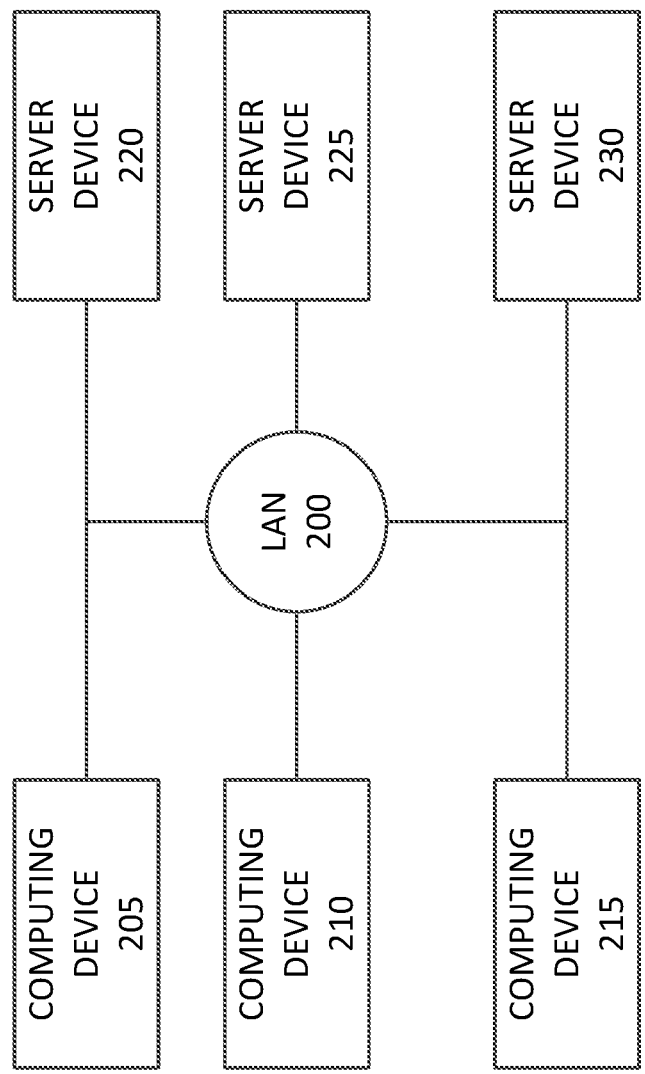
FIG. 2 is another block diagram of an encryption management system according to exemplary aspects of the present disclosure.

FIG. 2 is an exemplary block diagram of a system that may form one or more of the blocks illustrated in FIG. 1. For example, the system illustrated in FIG. 2 may correspond to the data owner 100, the regional concierge 105, the data storage 110, the distributed ledger 115, the permission authority 135, or any of the key managers 120, 125, 130. In the event that any of the blocks in FIG. 1 are encompassed in a single system, that single system may be exemplified by the one illustrated in FIG. 2. For example, the data owner 100, the regional concierge 105, and the data storage 110 may be part of a single system such as that of FIG. 2. Other combinations of the different blocks of FIG. 1 into a single system, such as that of FIG. 2, are also possible as can be appreciated.

The exemplary system illustrated in FIG. 2 includes a plurality of computing devices 205, 210, 215 and a plurality of server devices 220, 225, 230 interconnected by a local area network (LAN) 200. As can be appreciated, the LAN 200 may be a packet-switch network that is private, public, or a combination of private and public. The LAN 200 may also include wired and wireless portions, and may be connected to a public network, such as the Internet.

The computing devices 205, 210, 215 can include desktop computers, laptop computers, tablet computers, mobile phones, thin clients, and any other known computing device. The computing devises 205, 210, 215 may also have permanent, semi-permanent, or temporary connections to the LAN 200. These connections may also be wired, such as an Ethernet connection, or may be wireless, such as a WiFi, Bluetooth, or cellular connection (i.e., 3G, 4G, LTE, etc.). Though three computing devices 205, 210, 215 are illustrated, the system of FIG. 2 may include any number of computing devices without limitation.

The servers 220, 225, and 230 are connected to the LAN 200 via permanent connections, and may store data and may provide services to the computing devices 205, 210, 215, such email, database services, and the like. In the system of FIG. 2, there may be more than three servers or fewer than three servers without limitation.

Figure 3:
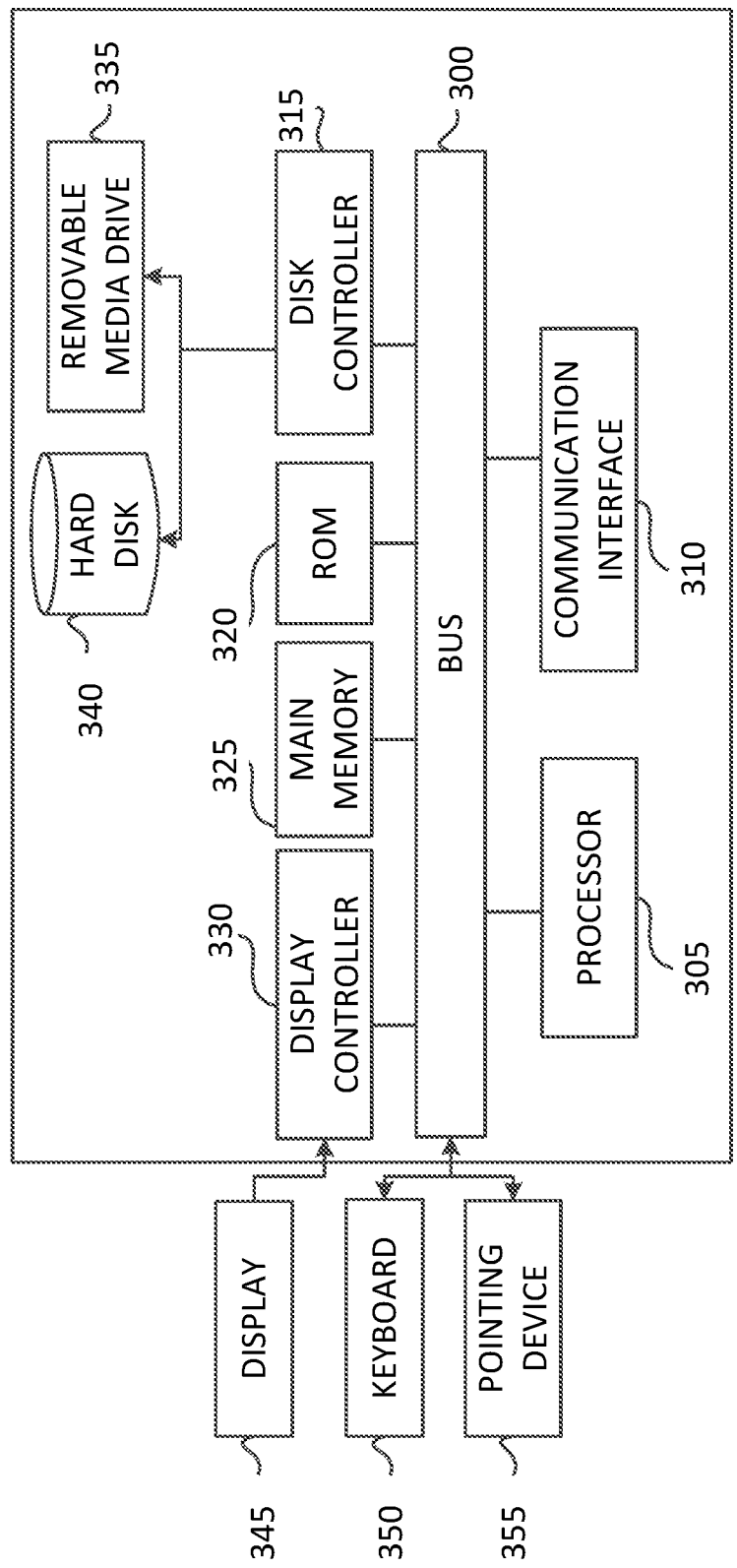
FIG. 3 is a hardware diagram of a computing device according to exemplary aspects of the present disclosure.

Next, a description of the hardware of computing devices 205, 210, 215 and servers 220, 225, 230 is provided with reference to FIG. 3. In the event that the blocks illustrated in FIG. 1 correspond to individual devices, the hardware of those devices may also be as illustrated in FIG. 3. The device of FIG. 3 includes a processor 305, communication interface 310, main memory 325, read only memory (ROM) 320, disk controller 315, display controller 330, hard disk 340, and removable media drive 335.

The processor 305 may be based on a reduced instruction set (RISC) circuit architecture, Von Neumann architecture, Harvard architecture, or any other processing circuit architecture that is known. The processor 305 may also be implemented as a system on a chip, application specific integrated circuit (ASIC), field programmable gate array (FPGA), or with discrete logic circuit components. The processor 305 may also be implemented in software that is executed on processing circuitry having any of the architectures described above.

The communication interface 310 is a circuit that connects the device of FIG. 3 to one or more communication networks, such as an Ethernet network, a cellular network, a WiFi network, a Bluetooth network, and the like. For example, the communication interface 310 may be a network interface card (NIC).

The main memory 325 and the ROM 320 are used to store instructions and other data needed by the processor 305 in order to carry out various tasks in accordance with exemplary aspects of the present disclosure. Specifically, the ROM 230, being a read-only memory circuit, may include permanent instructions that do not require changes, such as lower-level routines. The main memory 325 may include a combination of random access memory and erasable programmable read only memory (EPROM) in order to store programming instructions that may be periodically updated and data that may change periodically or frequently during as the processor 305 executes instructions.

The display controller 330 is an interface circuit that permits a display 345, such as a liquid crystal display, to be connected to the device of FIG. 3 in order to provide visual information to a user thereof. The disk controller 315 is an interface circuit that permits devices such as a hard disk 340, which provides mass storage, to be connected to the bus 300 and therefore, the processor 305. The disk controller 315 also permits the connection of other removable media 335, such as an optical disk reader or a secure digital (SD) card, a memory stick and the like. A keyboard 350 and a pointing device 355, such as a mouse, may also be connected to the device illustrated in FIG. 3 to provide a way of entering data into the device by a user thereof. Further description of these components is omitted for the sake of brevity.

Figure 4A:
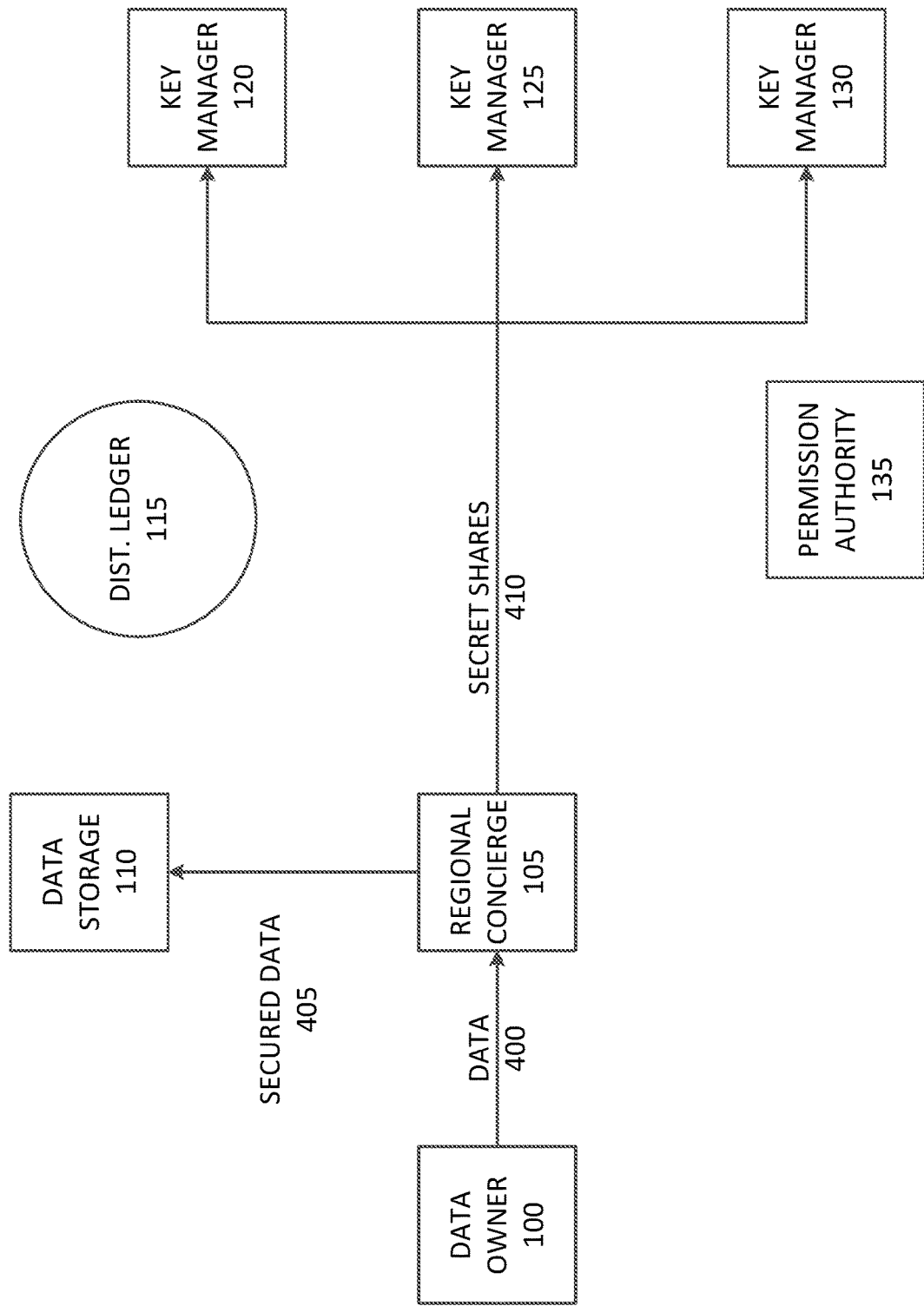
FIG. 4A is a functional block diagram of an encryption management system according to exemplary aspects of the present disclosure.

Next a description of the various functions performed by the data owner 100, the regional concierge 105, the data storage 110, the distributed ledger 115, the permission authority 135, and the key managers 120, 125, 130 is described with reference to FIGS. 4A-4D. In FIG. 4A, the data owner 100 passes the data to be securely stored to the regional concierge 105 in step 400. Note that the type and amount of data to be securely stored is limiting upon the present disclosure as the inventive features described herein are applicable to the storage of any type and amount of data. After receiving the data from the data owner 100, the regional concierge 105 encrypts the data using an encryption key and transfers the encrypted data to the data storage 110 at step 405 where the encrypted data is securely stored.

The regional concierge 105 then generates secret shares from the encryption key, and distributes the secret shares to the key managers 120, 125, 130 at step 410. In one exemplary aspect, each key manager 120, 125, 130 receives one secret share. However, each key manager 120, 125, 130 may receive more than one secret share, and each key manager 120, 125, 130 may store secret shares corresponding to different encryption keys for different encrypted data.

The regional concierge 105 may generate the secret shares using an algorithm, such as the Shamir Secret Sharing Scheme, but other methods and algorithms for generating secret shares are also possible. Once the secret shares are generated and distributed, the regional concierge destroys the encryption key. Alternatively, the regional concierge 105 may not destroy the encryption key, and may maintain the encryption key securely stored for access by an entity, such as a government entity.

Figure 4B:
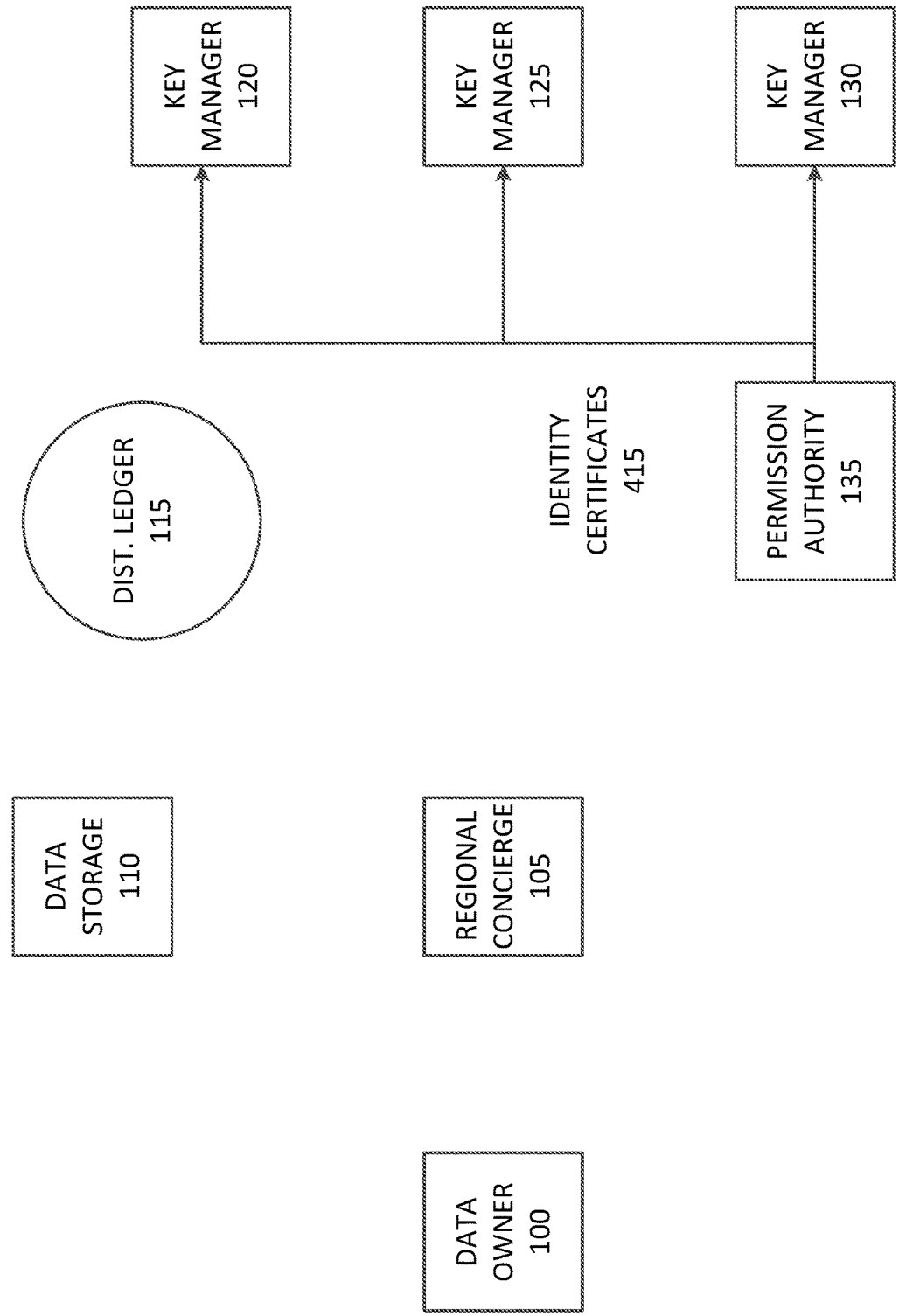
FIG. 4B is another functional block diagram of an encryption management system according to exemplary aspects of the present disclosure.

As illustrated in FIG. 4B, the permission authority 135 may provide identity certificates to each of the key managers 120, 125, 130. The identity certificates are generated by the permission authority 135 based on information from the key managers 120, 125, 130, but do not reveal the identity of the key managers 120, 125, 130. Instead, the certificates vouch for the key managers 120, 125, 130 such that a message from, for example, key manager 120 that includes the certificate of key manager 120 can be authenticated as being a legitimate message even though the identity of key manager 120 is not disclosed in the message, in the certificate, or during authentication of the message.

The identities of the key managers 120, 125, 130 are known to the permission authority 135. The permission authority verifies the identities of the key managers 120, 125, 130, and generates the identity certificates using a pseudonym in order to protect the true identity of the key managers 120, 125, 130, which remain anonymous to each other. The permission authority can also include additional information in the certificates, such as a key manager's clearance level, and a key manager's approximate geographical location. The permission authority 135 may also set a time limit for an identity certificate, requiring the identity certificate to be renewed periodically. The permission authority may also require renewal of an identity certificate upon occurrence of an event, such as movement of a key manager from one geographic region to another, a change in the number or composition of key managers, and the like. Of course, numerous other events may trigger renewal of an identity certificate as one of ordinary skill would recognize. The events described above are merely exemplary.

In order to generate the identity certificates, the permission authority 135 may verify that the key managers 120, 125, 130 are related to the data owner 100 in some way, such as a spouse, child, other family relative, or business associate, and that the key managers 120, 125, 130 are residents of a particular geographic area, such as a city, state, country. The permission authority 135 may also verify an amount of money held by the key managers 120, 125, 130, or otherwise verify their financial state, and may verify security clearances of the key managers 120, 125, 130. As can be appreciated, the permission authority 135 may verify any information related to the key managers 120, 125, 130, or pertaining to the relationship between each of the key managers 120, 125, 130 and the data owner 100 without limitation. The above-noted information items are merely exemplary.

In order to verify key manager information, the permission authority 120, 125, 130 may be part of a corporation, and for example, be associated with, or form part of, a human resources department of the corporation. The permission authority may also be part of local or regional government, such as city government, state or provincial government, or the government of a country. The permission authority 135 may also be part of an international body, such as the United Nations, World Health Organization, World Monetary Fund, or the like. In fact, the particular organization or entity of which the permission authority 135 forms a part is not limiting upon the present disclosure.

Using the information described above, the permission authority generates a certificate for each of the key managers 120, 125, 130, and distributes the certificates to the respective key managers 120, 125, 130 at step 415. Note that the certificates are provided to the key managers 120, 125, 130 by the permission authority 135 through, for example, the network 140 of FIG. 1. The certificates may also be provided to the key managers 120, 125, 130 by the permission authority 135 by uploading the certificates to the distributed ledger 115. In certain exemplary aspects, the certificates of the key managers 120, 125, 130 may be loaded onto portable storage media and physically delivered to the locations of the key managers 120, 125, 130. Other methods of distributing the certificates to the key managers 120, 125, 130 are also possible without departing from the scope of the present disclosure.

Figure 4C:
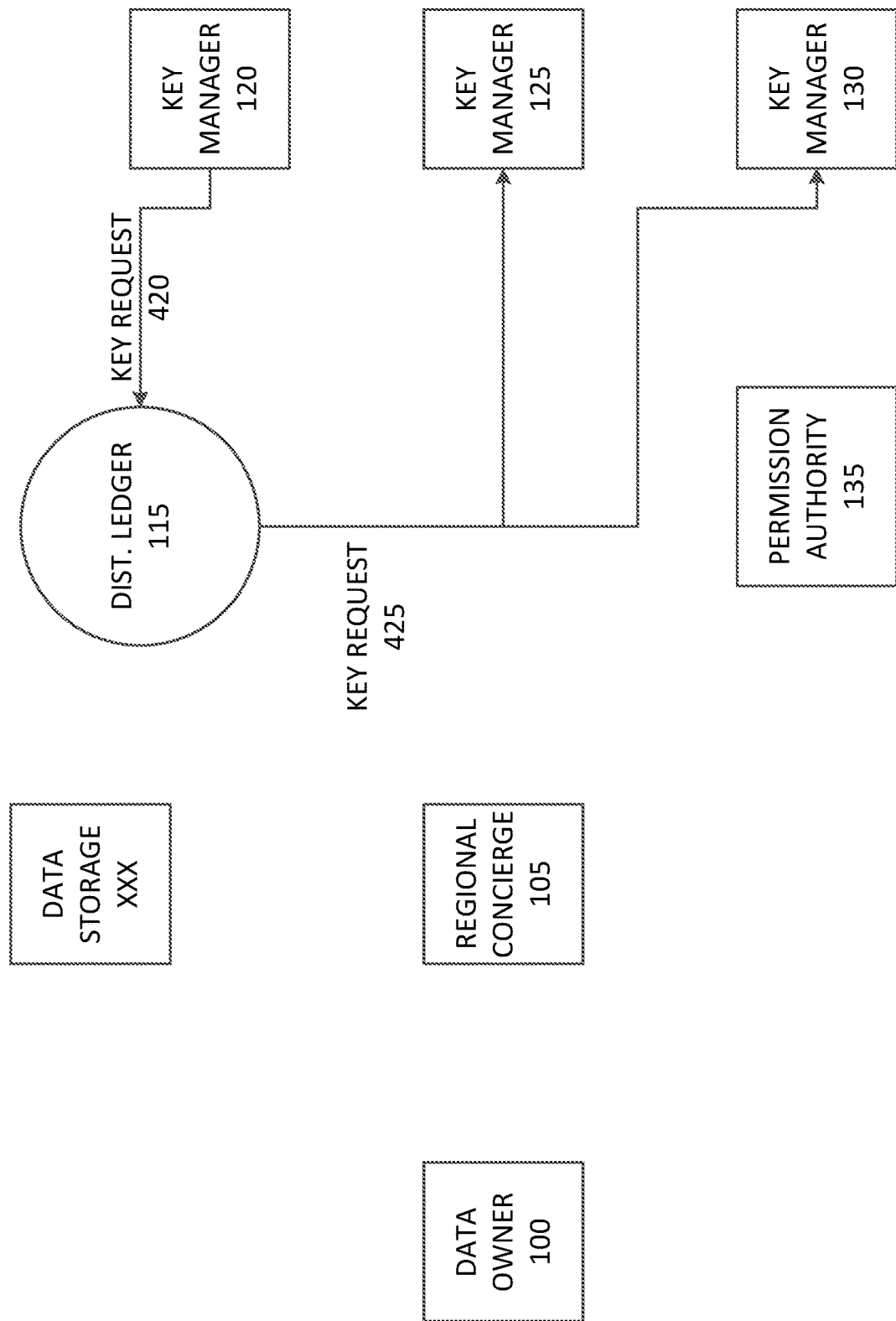
FIG. 4C is a further functional block diagram of an encryption management system according to exemplary aspects of the present disclosure.

FIG. 4C illustrates generation and transmission of a key request by one of the key managers, such as key manager 120, according to exemplary aspects of the present disclosure. In FIG. 4C, the key manager 120 generates a key request in which it requests the secret shares of the other key managers 125 and 130. The key manager 120 signs the request with its certificate, which it received from the permission authority 135 as explained above with reference to FIG. 4B. Then the key manager 120 anonymously uploads the request to the distributed ledger 115 at 420.

Because the key managers 120, 125, 130 all monitor the distributed ledger 115, the other key managers 125 and 130 detect that a request has been uploaded to the distributed ledger 115, and download the request at 425. Each key manager 125 and 130 then authenticates the request to ensure that it is a legitimate request even though the key managers 125 and 130 are unable to determine the identity of the sender of the request from the request itself. Then each key manager 125, 130 compares the request to their own internal policy to determine whether to grant or deny the request.

Figure 4D:
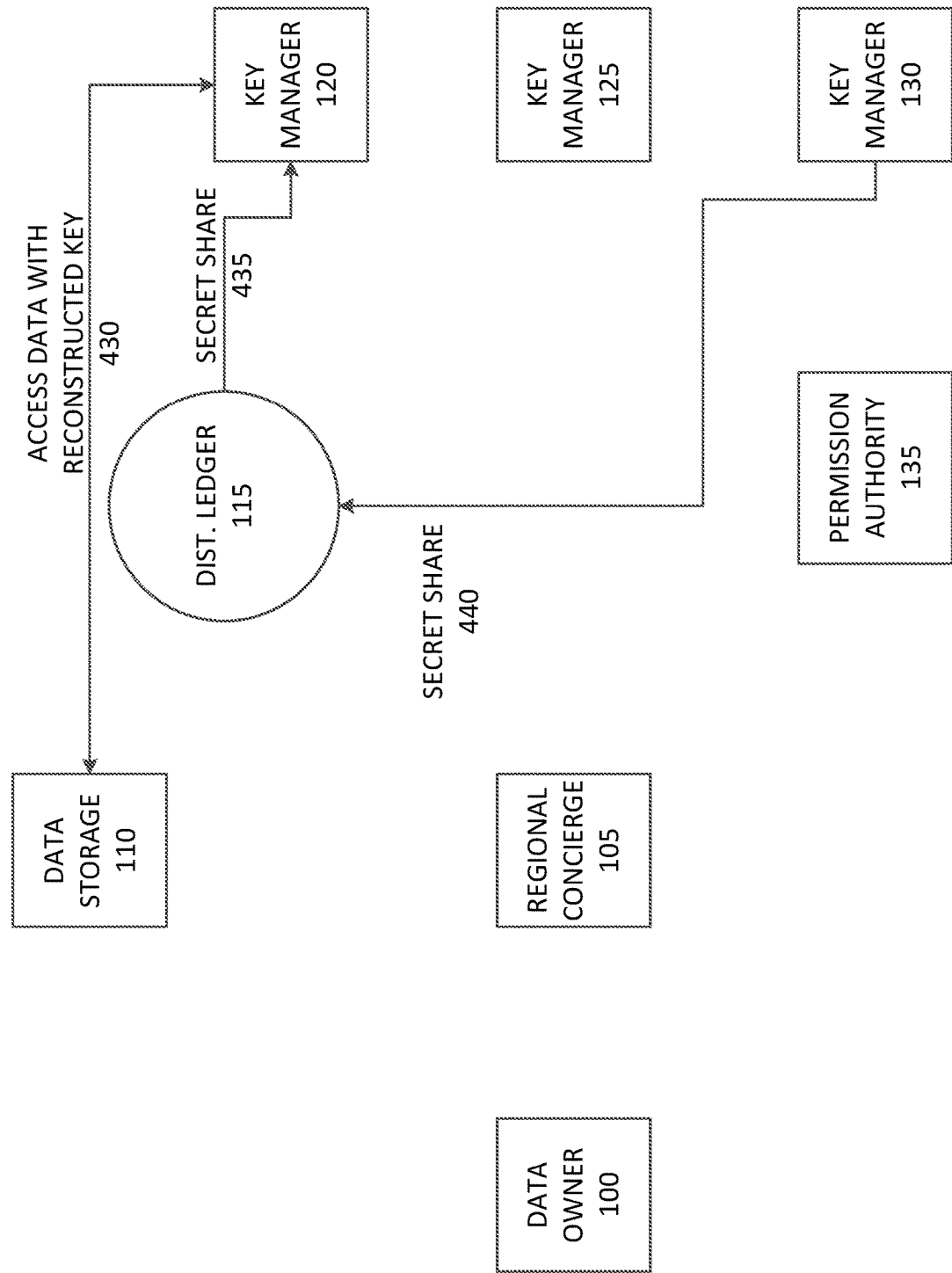
FIG. 4D is another functional block diagram of an encryption management system according to exemplary aspects of the present disclosure.

For example, in FIG. 4D the key manager 125 determines not to grant the request from key manager 120. Therefore, the key manager 125 takes no action with regard to the request, and does not upload anything to the distributed ledger 115. Alternatively, the key manager 125 may anonymously upload a message to the distributed ledger 115 indicating that the request from the key manager 120 is denied.

The key manager 130 determines to grant the request sent by the key manager 120, and in response anonymously uploads a message including its secret share to the distributed ledger 115 at 440. The message including the secret share of the key manager 130 may be signed with the certificate of the key manager 130 in order to demonstrate that the message is authentic without divulging the identity of the key manager 130.

The key manager 125 downloads the message from the key manager 130 at 435, and authenticates the message. Once the message is authenticated, the key manager extracts the secret share of the key manager 130 and determines whether it has enough secret shares, including its own secret share, to recover the encryption key. If the key manager 120 determines that it has enough secret shares to recover the encryption key, the encryption key manager 120 may then combine the secret shares in its possession in order to recover the encryption key. Once the encryption key is recovered, the key manager may access the encrypted data stored in the data storage 110 at 430, decrypt the data using the encryption key, and use the data.

If, on the other hand, the key manager 120 determines that it does not have enough secret shares to recover the encryption key, the key manager 120 may hold the secret shares received from other key managers for a predetermined amount of time in order to wait for the uploading of additional secret shares by other key managers. If no other secret shares are uploaded, the key manager 120 may destroy the secrets shares received from other key managers, such as key manager 130.

Figure 5:
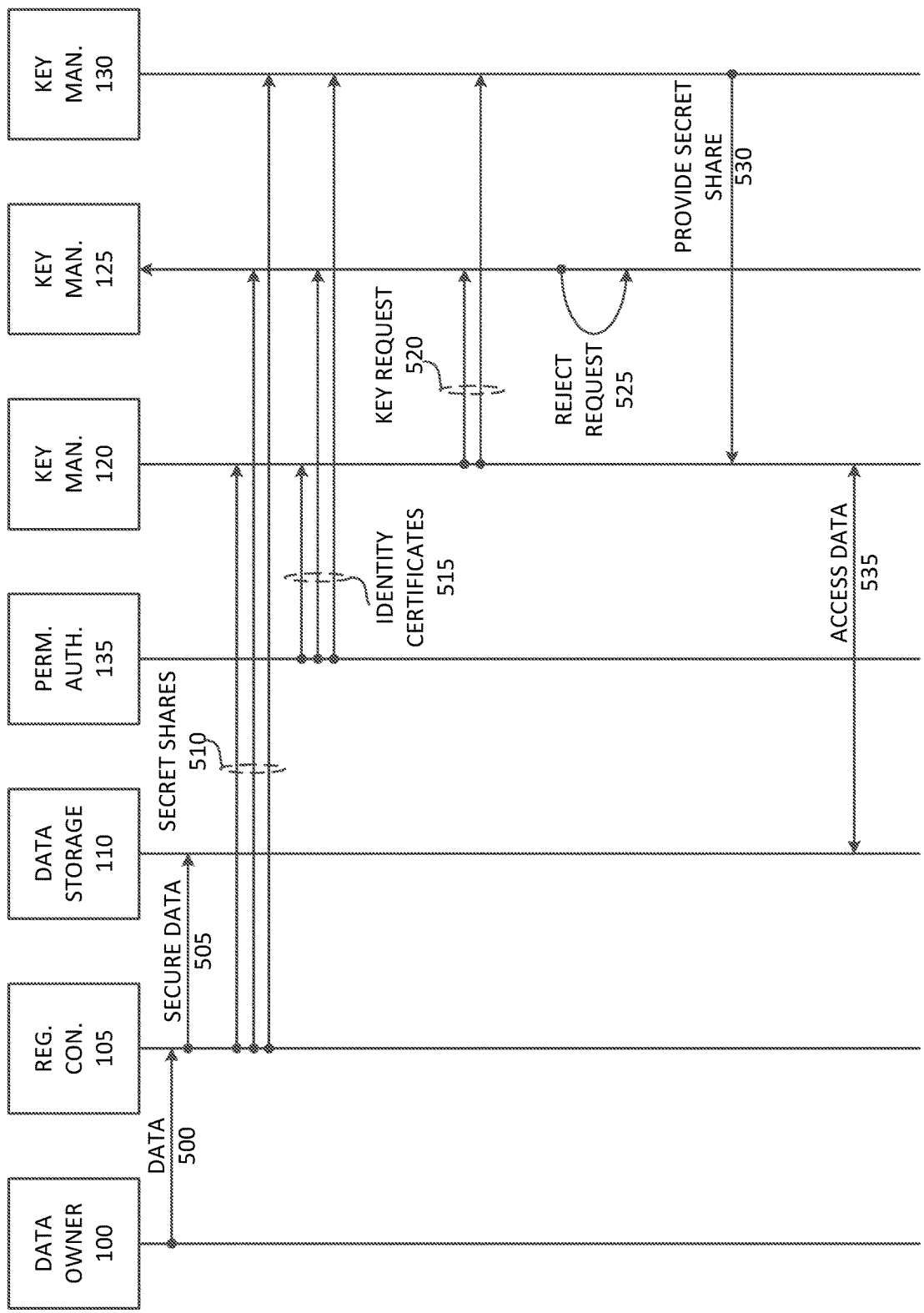
FIG. 5 is a communication process diagram according to exemplary aspects of the present disclosure.

Next the communications exchanged among the data owner 100, regional concierge 105, data storage 110, permission authority 135, and key managers 120, 125, 130 is described with reference to FIG. 5. In FIG. 5, the data owner 100 transmits the data to be secured to the regional authority 105 at 500. At 505, the regional authority 105 transmits the data to the data store via secure transmission after the data is encrypted using an encryption key. For example, the secure transmission may be performed through a virtual private network (VPN) connection or may be otherwise encrypted.

The regional authority 105 then generates secret shares for the key managers 120, 125, 130, as described above, and transmits the secret shares to the key managers 120, 125, 130 at 510. As can be appreciated, the transmission of the secret shares may be made through a secure connection, such as a virtual private network (VPN) connection, and the secret share may be encrypted as an extra measure of security.

The permission authority 135 distributes certificates to the key managers 120, 125, 130 at 515 by, for example, using a secure connection such as those described above. The certificates may also be encrypted prior to transmission.

At 520, the key manager 120 generates a key request and sends the key request anonymously to the other key managers 125, 130. As can be appreciated, the key request is sent to the other key managers 125, 130 via the distributed ledger 115 using a system such as Tor to preserve anonymity. The key managers 125 and 130 authenticate the request and determine whether to upload their secret shares, or not, in response to the request based on their own internal policies.

In the case of the key manager 125, which determines not to upload its secret share at 525, no further action is taken and no further communication is generated. In the case of the key manager 130, which determines to upload its secret share to the distributed ledger 115, the key manager generates a message including its secret share and signed with its certificate, and anonymously uploads it to the distributed ledger 115 at 530.

The key manager 120 continuously monitors the distributed ledger 115 for messages, and detects the message uploaded by the key manager 130. Though the key manager 120 cannot determine the identity of the key manager 130 from the message, it can nonetheless authenticate the message because of the signature based on the certificate of the key manager 130. Therefore, the key manager 120 is able to extract the secret share from the message sent by the key manager 130, and combine this secret share with its own in order to recover the encryption key. At 535 the key manager 120 may use the encryption key to access the data stored in the data storage 110, and decrypt the data for use.

Figure 6:
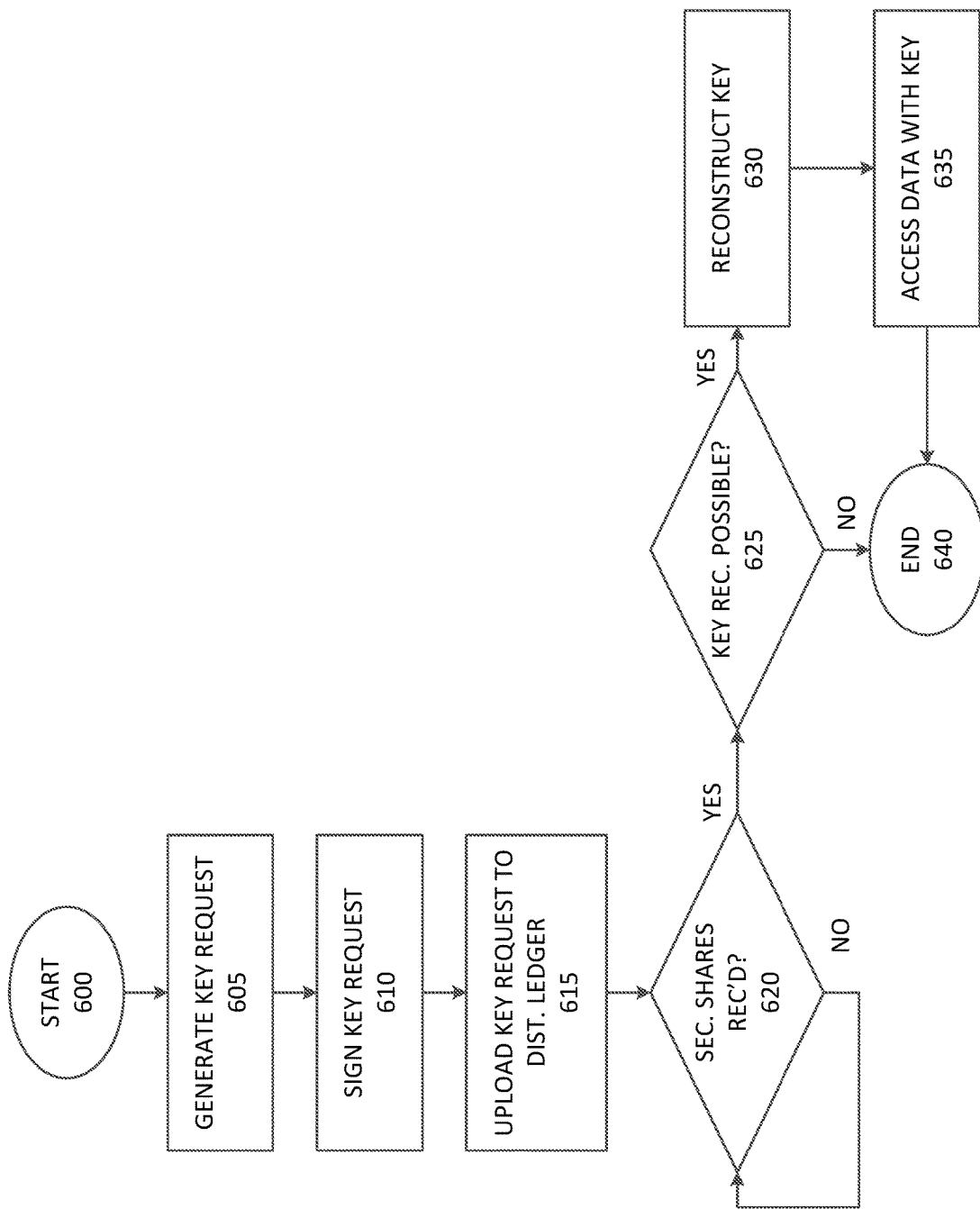
FIG. 6 is an algorithmic flow chart of a process performed by a computing device according to exemplary aspects of the present disclosure.

Next the process performed by a key manager that requests secret shares from other key managers, such as key manager 120 of FIGS. 4A-4B and 5, is explained with reference to the algorithmic flowchart of FIG. 6. The process in FIG. 6 begins at step 600, and proceeds to step 605 where the key manager generates a key request. At step 610, the key manager signs the key request with its certificate, and at step 615 the key manager uploads the signed key request to a distributed ledger, such as the distributed ledger 115 described above. The key manager then monitors the distributed ledger for messages that may include secret shares in response to the uploaded key request.

If, at 620, the key manager determines that a message including a secret share has been uploaded to the distributed ledger, the key manager proceeds to 625 where it authenticates the message and extracts the secret share included therein. At step 625, the key manager also determines whether it has sufficient secret shares to recover the encryption key. If so, the key manager proceeds to 630 in order to reconstruct the encryption key and then accesses the data encrypted with the encryption key at 635.

If, at 620, the key manager does not detect a message in the distributed ledger, the key manager remains at 620 to continue to monitor the distributed ledger. Although not illustrated, in one exemplary aspect the key manager may monitor the distributed ledger for a predetermined amount of time and then end the process at 640 if a message including a secret share is not uploaded during that time. Alternatively, the key manager may always monitor the distributed ledger. This way the key manager can not only monitor the distributed ledger for responses to its own key requests, it can also monitor the distributed ledger for key requests from other key managers.

At 625, if the key manager determines that it does not have enough secret shares, it may proceed to 640 in order to end the process. At 640, the key manager may destroy any secret shares from other key managers that it might have in its possession.

Figure 7:
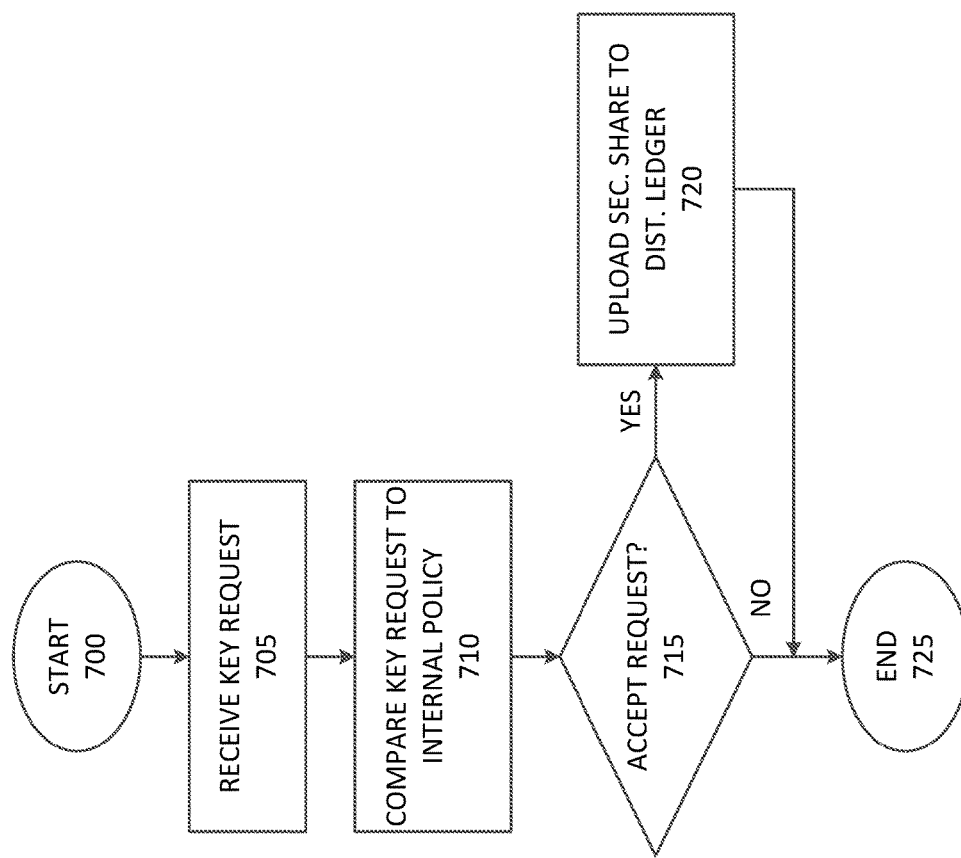
FIG. 7 is another algorithmic flow chart of a process performed by a computing device according to exemplary aspects of the present disclosure.

Next a process performed by a key manager that receives a key request is described with reference to FIG. 7. The process illustrated in FIG. 7 begins at step 700 and proceeds to step 705 where the key manager receives a key request. As noted above, the request may be received via a distributed ledger, such as distributed ledger 115, which the key manager monitors. Also as described above, the request may be anonymous in that it is not possible to discern the identity of the originator of the request from the request itself.

At step 710, the key manager compares the request to its own internal policies. This can include determining whether the request originated from a particular region, whether certain global, political, or economic conditions are satisfied, and the like. For example, the key manager may have a policy against giving access to the encryption key to entities located in a country different than the country in which the key manager is located. Therefore, if the key manager determines that the request originated from a different country, the key manager may deny the request and not send its secret share to the originator of the request. Note also that each key manager may have its own set of policies, at least some of which differ from the policies of the other key managers.

At step 715, the key manager that received the request determines whether to accept the request after comparing the requests to its internal policies. If the key manager accepts the request, the process proceeds to step 720 in which the key manager uploads the request to the distributed ledger, such as distributed ledger 720. Then the process ends at step 725.

If at step 715 the key manager does not accept the request, the process proceeds to step 725 and ends. Note that the key manager does not respond to the request if it denies the request, and therefore does not upload or otherwise communicate a notification of refusal to the key manager that transmitted the request. In the alternative, however, the key manager may upload a notice of refusal of the request to the distributed ledger 115. As with other communications, the notice of refusal is anonymous such that its originator cannot be identified from the notice itself. The sending of a notice of refusal may allow the key manager that sent the request to more quickly determine whether the possibility of receiving additional secret shares exists or whether all of the other key managers have responded and no more secret shares will be received. Of course, other variations are also possible without departing from the scope of the present disclosure.

In aspects of the present disclosure, it may be advantageous to avoid transmitting secret shares over the distributed ledger 115, or via any other communication medium, in response to a request for recovery of the encryption key. In such as case, a multi-party computation scheme may be utilized. The multi-party computation scheme, or MPC, is a cryptographic primitive which allows two or more parties to compute a function, i.e., a secret sharing scheme, of their respective inputs, i.e., their respective secret shares without actually revealing their secret shares to the other parties. Instead, a party may reconstruct the encryption key without knowing the other parties' secret shares by receiving the other parties' MPC views and combining those MPC views with its own. This process is explained in further detail with reference to FIGS. 8A-8B below.

Figure 8A:
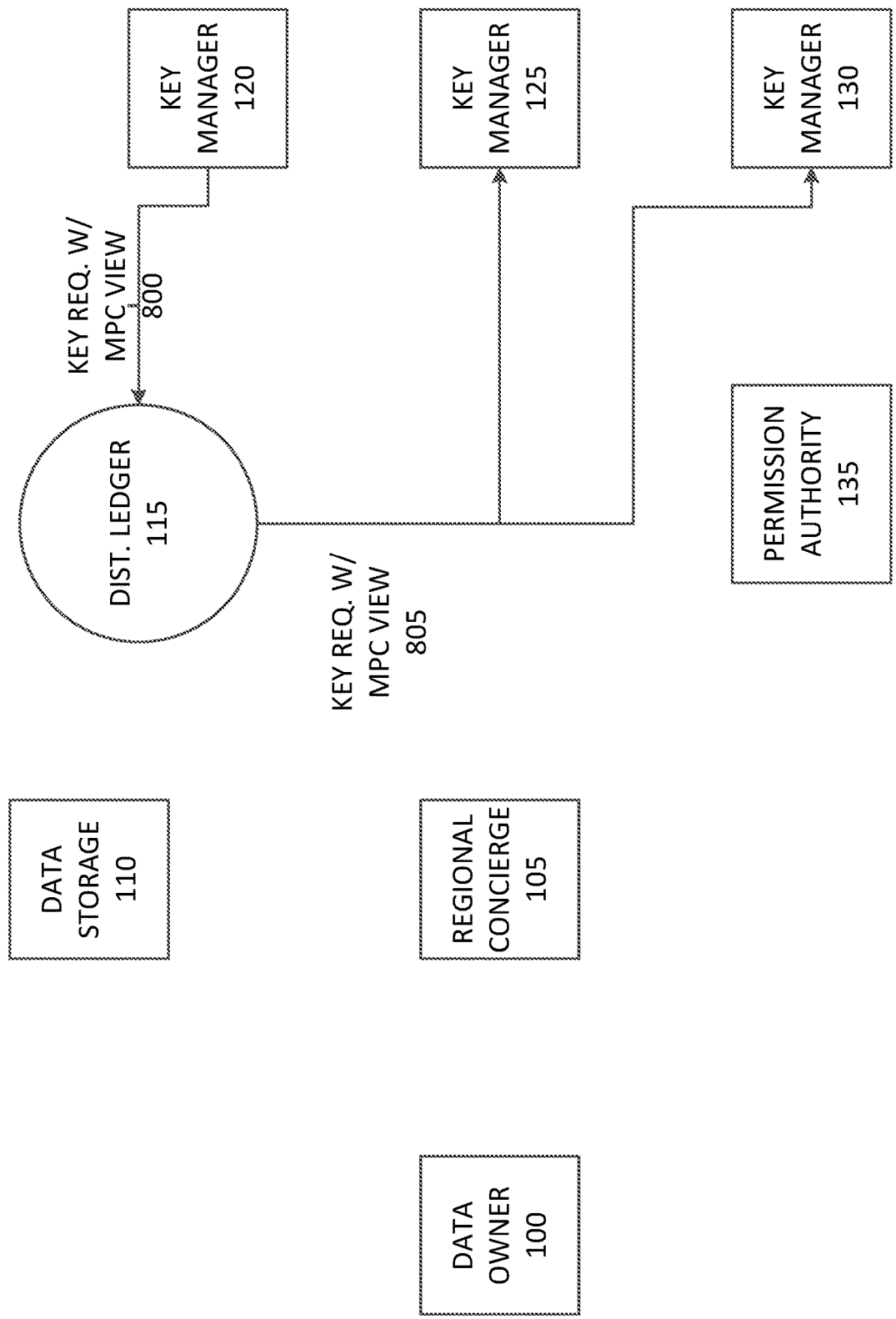
FIG. 8A is a functional block diagram of an encryption management system according to exemplary aspects of the present disclosure.
Figure 8B:
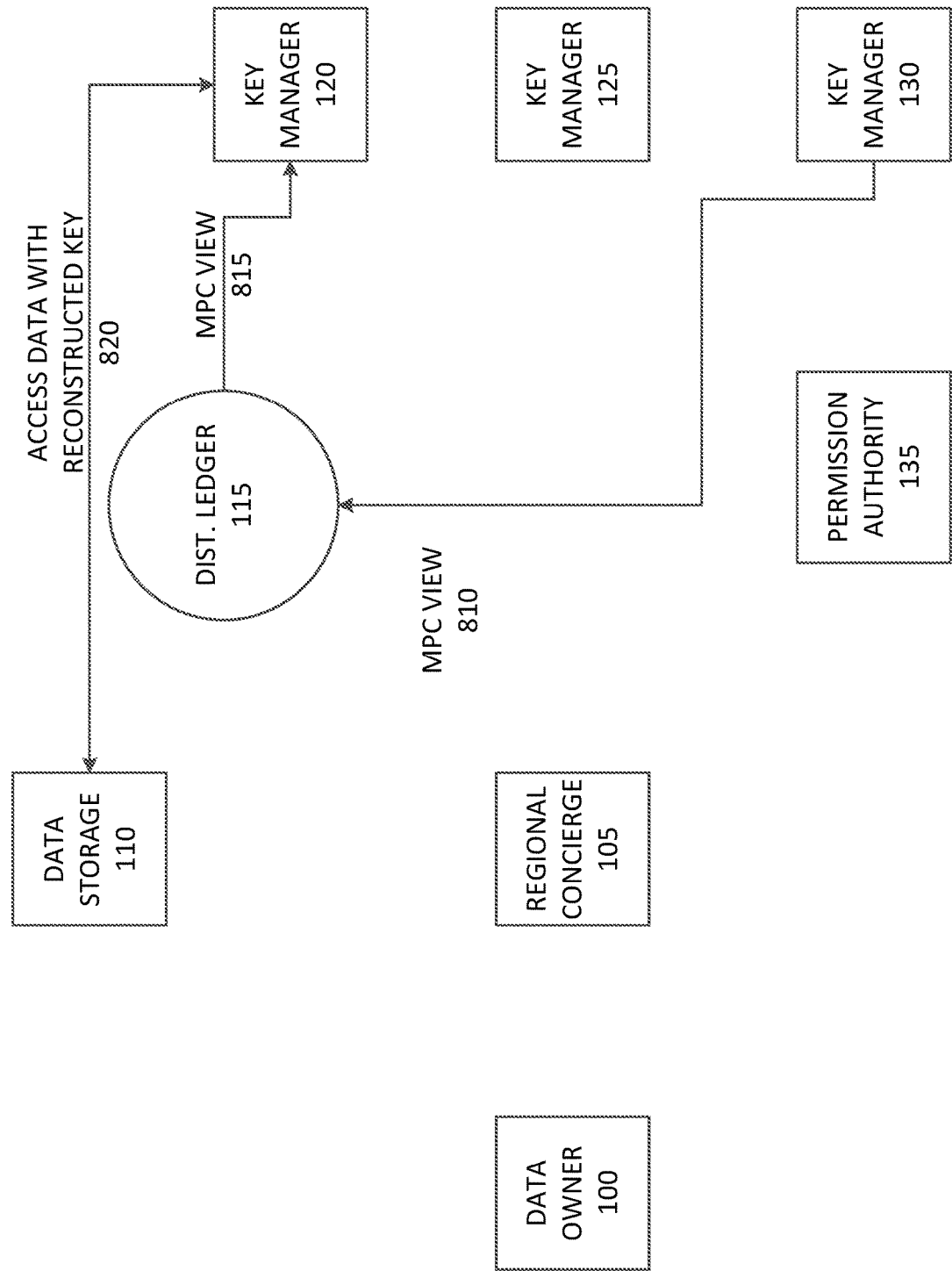
FIG. 8B is another functional block diagram according to exemplary aspects of the present disclosure.

In FIG. 8A, the key manager 120 generates a key request which includes its MPC view and which is signed with its identity certificate. As described above, the key manager 120 receives the identity certificate from the permission authority 135. After preparing the key request, the key manager 120 uploads the key request to the distributed ledger 115, which can be a block chain, anonymously at 800. As noted above, this can be done using Tor or a similar system for maintaining anonymity.

The other key managers 125 and 130 monitor the distributed ledger 115 to determine whether a request, or other relevant communication, has been uploaded. Therefore, the key managers 125 and 130 are able to detect that a key request was uploaded to the distributed ledger 115, and download the key request at 805. As noted above, the key request includes the MPC view of the key manager 120 and is signed with the identity certificate of the key manger 120.

Each key manager 125 and 130 determines whether to accept or deny the key request based on its own internal policies, as described above. For example, key manager 125 denies the request and therefore takes no further action with regard to the request.

Key manger 130 accepts the request, and uploads a response to the distributed ledger 115 at 810. The response from the key manager 130 includes the MPC view of the key manager 130 and is signed with the identity certificate of the key manager 130. Also, the key manager 130 uploads the response to the distributed ledger 115 anonymously using a system such as Tor, or any other system to maintain anonymity that is known.

The key manager 120, which sent the key request, monitors the distributed ledger 115 for responses from the other key managers 125 and 130. At 815, the key manager 120 determines that a response has been uploaded to the distributed ledger 115, and downloads the response. Then the key manager 120 extracts the MPC view included in the response and combines it with its own MPC view to determine whether the two MPC views are sufficient to recover the encryption key. If the encryption key can be recovered, the key manager 120 accesses the data stored in the data storage 110 at 820.

If the key manager does not receive enough responses to recover the encryption key, the key manager 120 may destroy the received response, or may store the MPC views in the received responses in case additional responses are received in the future. In one aspect, the MPC views in the responses received by the key manager 120 may expire after a predetermined amount of time to prevent the key manager 120 from storing the MPC views indefinitely and ultimately recover the encryption key. Other variations are also possible as one of ordinary skill would recognize.

Figure 9:
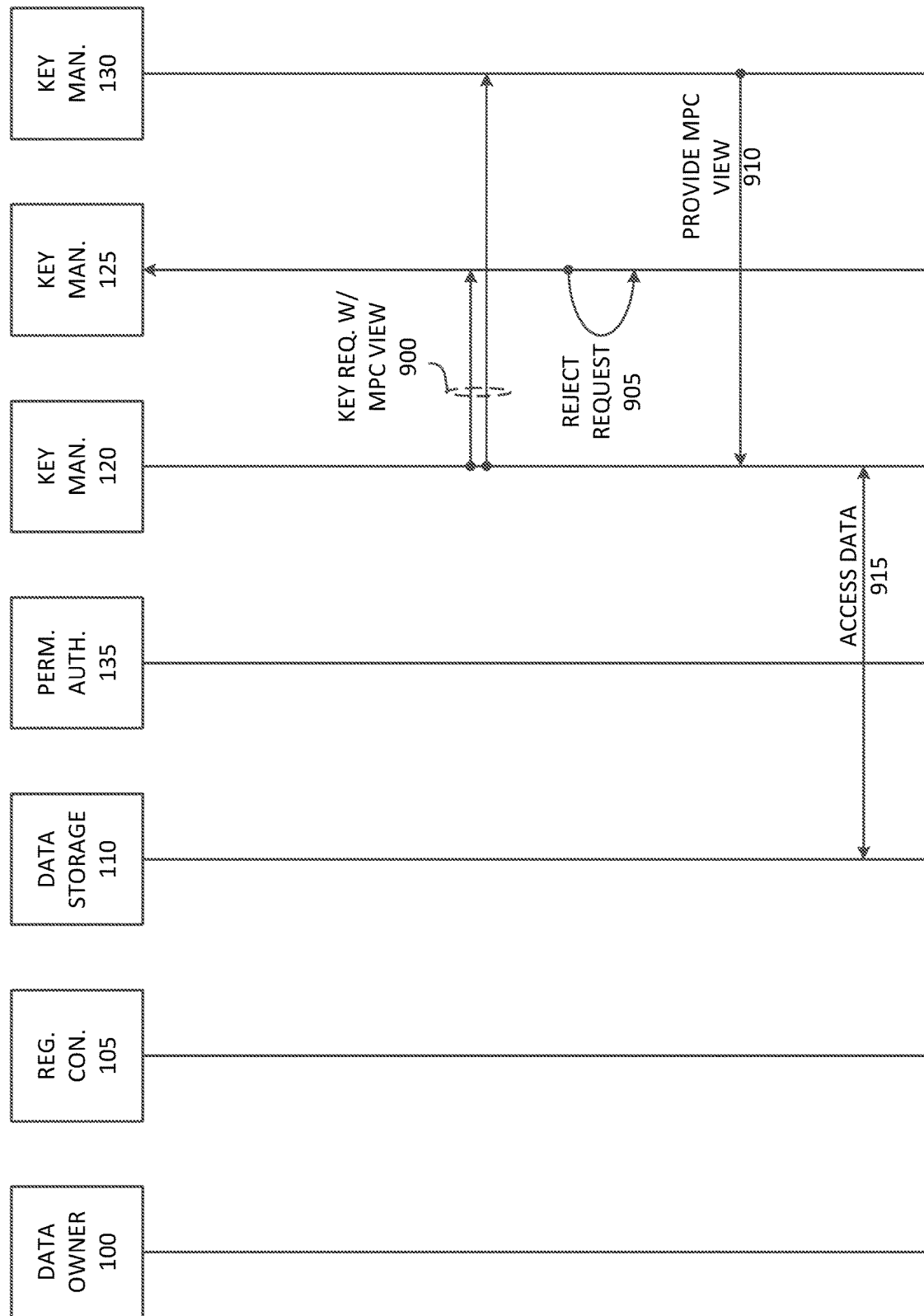
FIG. 9 is a communication process diagram according to exemplary aspects of the present disclosure.

Next, the communication exchange among the key managers 120, 125, and 130, and the data storage 110 is described with reference to FIG. 9. At 900, the key manager 120 anonymously communicates a key request to the key managers 125 and 130 via, for example, the distributed ledger 115. As noted above, the key request may include the MPC view of the key manager 120 and is signed by the identity certificate of the key manager 120. However, it is impossible to determine the identity of the key manager 120 from the key request. In an exemplary variation, the key request may not include the MPC view of the key manager 120.

At 905 the key manager 125 denies the key request from the key manager 120 based on its internal policies. Therefore, the key manager 125 takes no further action regarding the key request. In an exemplary variation, the key manager 125 may send the key manager 120 a notification of denial by anonymously uploading the notification to the distributed ledger 115. The notification may be signed with the identity certificate of the key manger 125, but may also protect the identity of the key manager 125 such that it is impossible to determine the identity of the sender of the notice from the notice itself.

At 910, the key manager 130 accepts the key request from the key manager 120, and in response sends the key manager 120 a response via the distributed ledger 115. As described above, the response includes the MPC view of the key manager 130 and is signed with the identity certificate of the key manager 130. However, it is impossible to determine the identity of the sender of the response from the response alone, thereby protecting the anonymity of the key manager 130.

At 915, the key manager 120 receives the response from the key manager 130 by downloading the response from the distributed ledger 115, and uses the MPC view in the response, together with its own MPC view, to recover the encryption key and access the data in the data storage 110.

Figure 10:
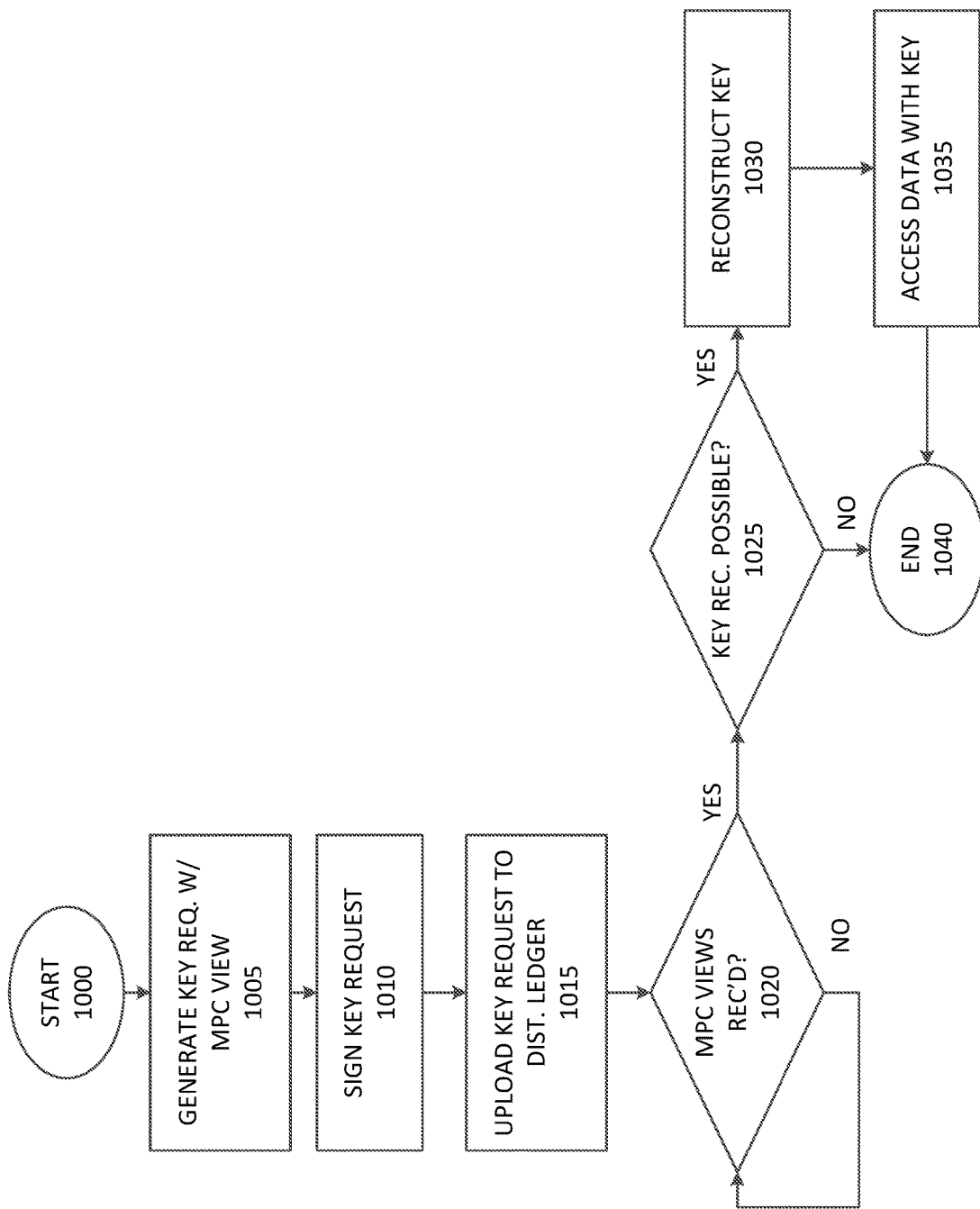
FIG. 10 is an algorithmic flowchart of a process performed by a computing device according to exemplary aspects of the present disclosure.

Next the process performed by a key manager that generates a key request is explained with reference to FIG. 10. The process in FIG. 10 begins at step 1000 and proceeds to step 1005 where the key manger generates a key request. As noted above, the key request may include the MPC view of the key manager, or, alternatively, the MPC view of the key manager may be omitted. At step 1010, the key manager signs the key request with its identity certificate, and the key manager uploads the key request to the distributed ledger 115 at step 1015. As noted above, the key request is anonymously uploaded to the distributed ledger 115, and because the sender of the key request cannot be identified from the key request itself, the identity of the key manager is protected.

At step 1020, the key manager monitors the distributed ledger 115 to determine whether a response to the key request has been uploaded. If a response has not been uploaded, the process remains at step 1020. As can be appreciated, the key manager may continually monitor the distributed ledger 115, and thus remain at step 1020 indefinitely, or the key manager may stop monitoring the distributed ledger 115 after a predetermined amount of time.

If, at step 1020, the key manager detects a response in the distributed ledger 115, the process moves to step 1020 where the key manager downloads the response, extracts the MPC view stored therein, and determines whether the encryption key can be reconstructed. If the encryption key cannot be reconstructed, the process ends at step 1040. However, if the encryption key can be reconstructed, the process moves to step 1030 where the key manager combines the MPC view received in the response with its own in order to reconstruct the encryption key. Then the process moves to step 1035 where the key manager accesses the data store in the data storage using the encryption key. Then the process ends at step 1040.

Figure 11:
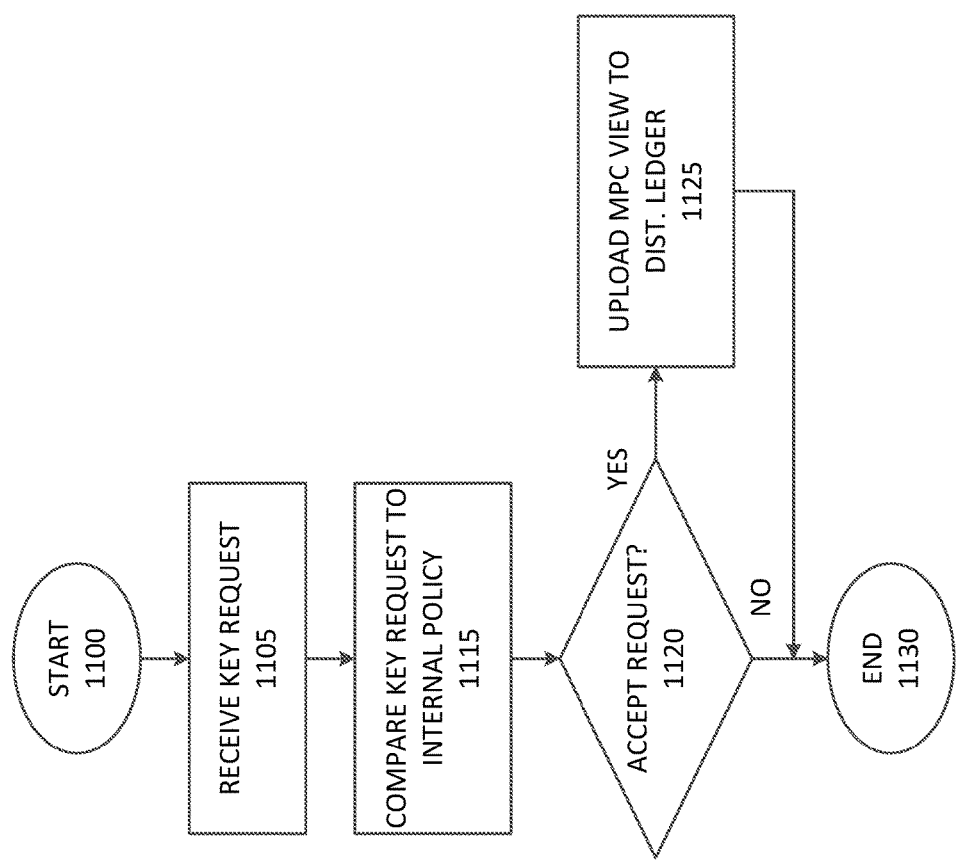
FIG. 11 is another algorithmic flowchart of a process performed by a computing device according to exemplary aspects of the present disclosure.

The process performed by a key manager that receives are key request is described next with reference to FIG. 11. The process in FIG. 11 begins at step 1100 and proceeds to step 1105 where the key manager receives a key request by downloading the key request from a distributed ledger 115. The key manager is unable to determine the identity of the sender of the key request, but the key manager is able to verify the authenticity of the request because the request has been signed with an identity certificate.

At step 1115, the key manager compares the key request to its internal policies in order to determine whether to allow or deny the request. The comparison of a request to internal policies of a key manager has been described above, and is not repeated here for the sake of brevity.

At step 1120, the key manager determines whether to accept or deny the key request based on the comparison of the key request to its internal policies. If the key manager denies the request, the process ends at step 1130. However, if the key manager accepts the request, the process moves to step 1125 where the key manager generates a response and uploads the response to the distributed ledger 115. As described above, the response includes the MPC view of the key manager and is signed with the identity certificate of the key manager. However, it is not possible to discern the identity of the key manager from the response alone. Also, the key manager uploads the request to the distributed ledger 115 anonymously as described above.

In certain exemplary aspects, it may be advantageous to regulate access to the data in the data storage 110 based on geographic location. For example, some regions may have more stringent regulations, such as the General Data Protection Regulation (GDPR) in Europe, than others. In such a case, access to the data in the data storage 110 may need to be restricted to regions that comply with GDPR. Use of the inventive features described herein in order to implement regional access is described below with reference to FIGS. 12A-12C.

Figure 12A:
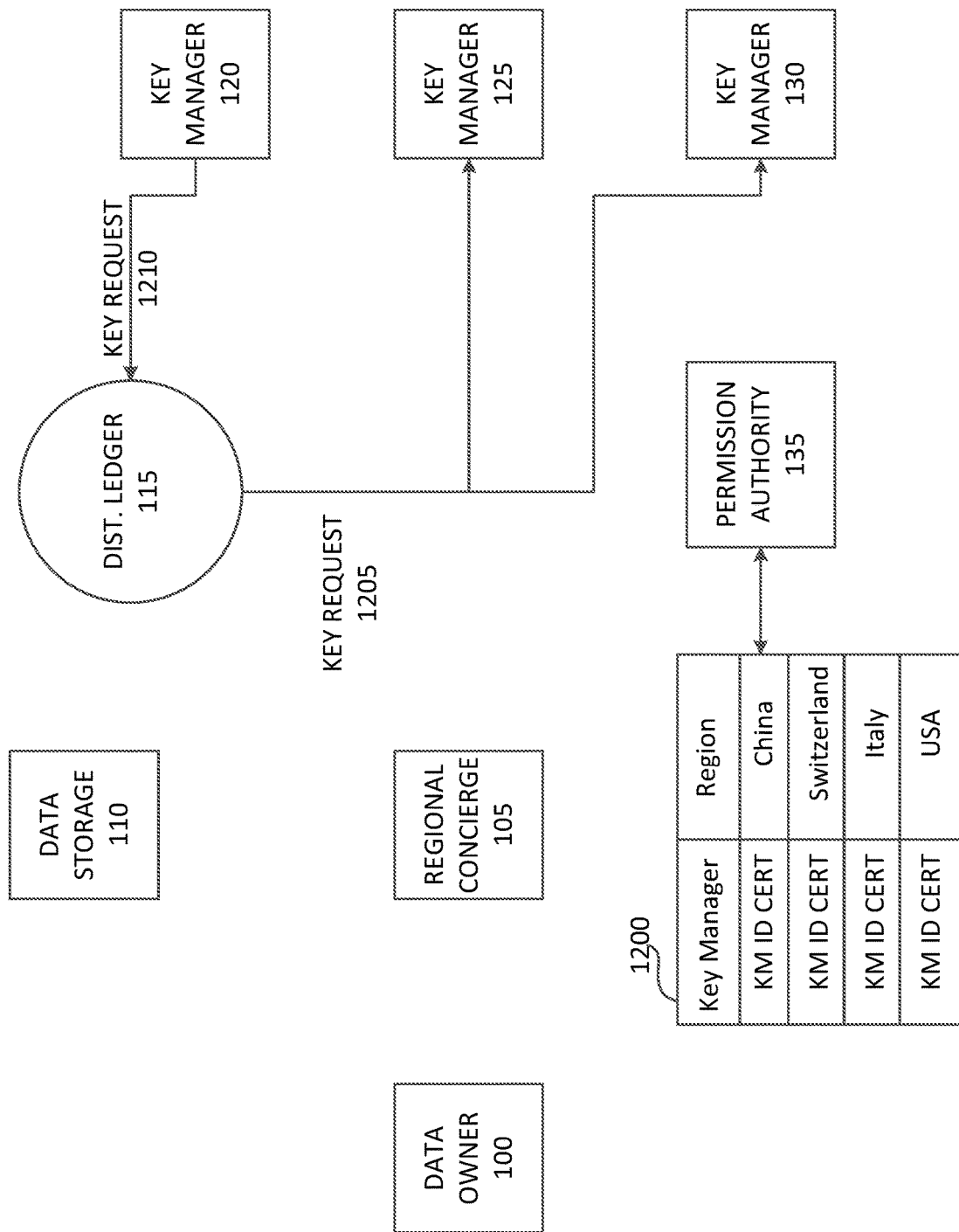
FIG. 12A is a functional block diagram of an encryption management system according to exemplary aspects of the present disclosure.

In FIG. 12A the permission authority 135 generates and maintains a regional identity register 1200 that associates the certificates of the key managers with the regions in which the corresponding key managers are associated. For example, in FIG. 12A the regional identity register 1200 associates key manager identity certificates with China, Switzerland, Italy, and the USA. As can be appreciated, the regional identity register 1200 in FIG. 12A is merely an example of a regional identity register, and other regional identity registers associating key manager identity certificates with other countries than the ones shown in FIG. 12A are possible. The regional identity register may also include more, or fewer, entries than those shown in FIG. 12A. Also, the permission authority 135 may also maintain multiple regional identity registers, as one of ordinary skill would recognize.

Figure 12B:
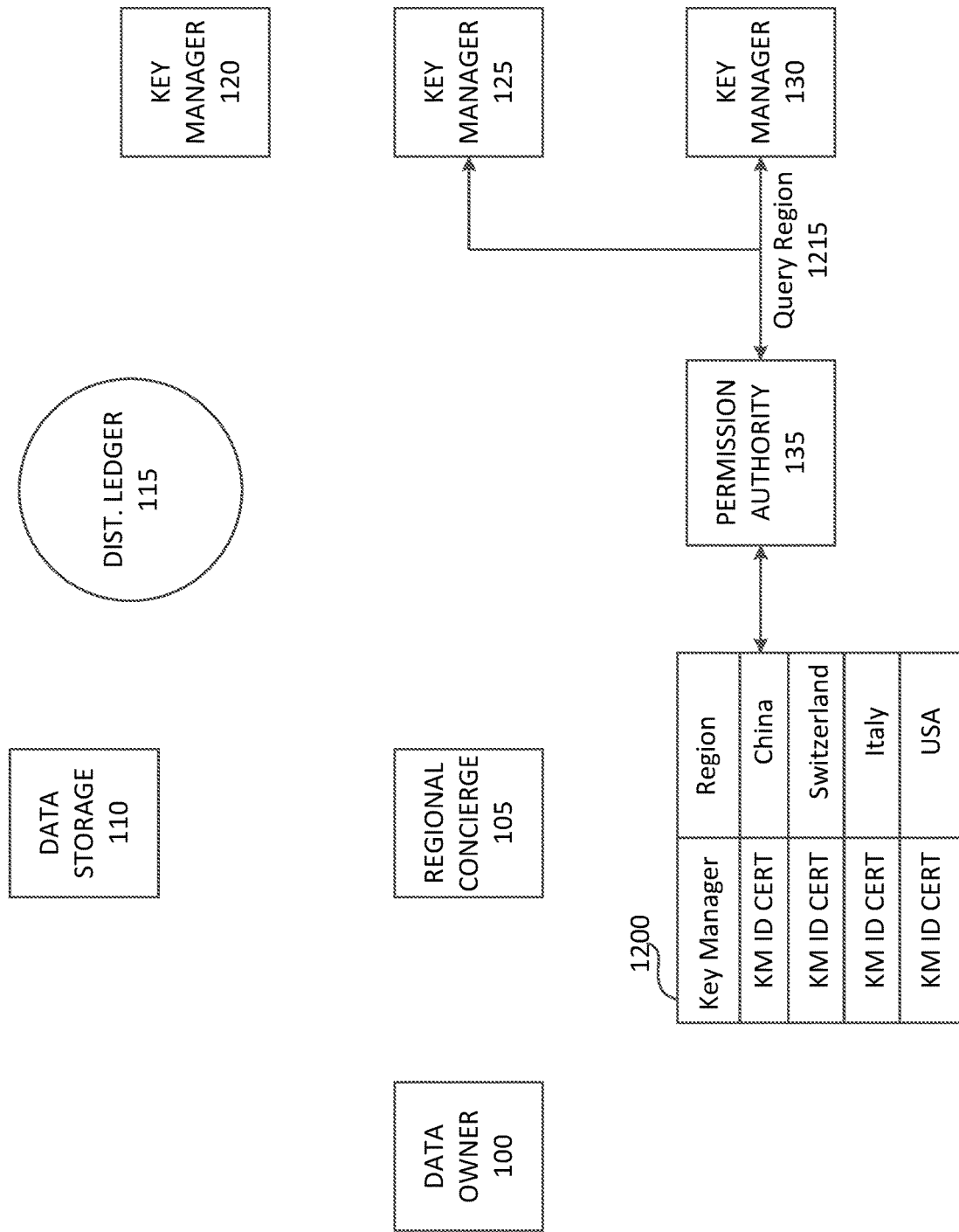
FIG. 12B is another functional block diagram of an encryption management system according to exemplary aspects of the present disclosure.

In FIG. 12A, the key manager 120 generates a key request and uploads the key request to the distributed ledger 115 at 1210. At 1205, the other key managers 125 and 130 download the key request from the distributed ledger 115. Then, as illustrated in FIG. 12B, the key managers 125 and 130 query the permission authority to determine whether the key request is from a key manager located in a region where access to the data in the data storage 110 is possible at 1215. The key managers 125 and 130 may query the permission authority 135 by, for example, providing the identity certificate included in the key request.

In response to the query, the permission authority 135 may respond to the key managers 125 and 130 with a country, or region, corresponding to the identity certificate provided by the key managers 125 and 130. This allows each of the key managers 125 and 130 to independently determine whether to accept the request by comparing the country to their own internal policies. Alternatively, the permission authority 135 may respond to the key managers 125 and 130 with a directive instructing them whether to accept or deny the request.

Figure 12C:
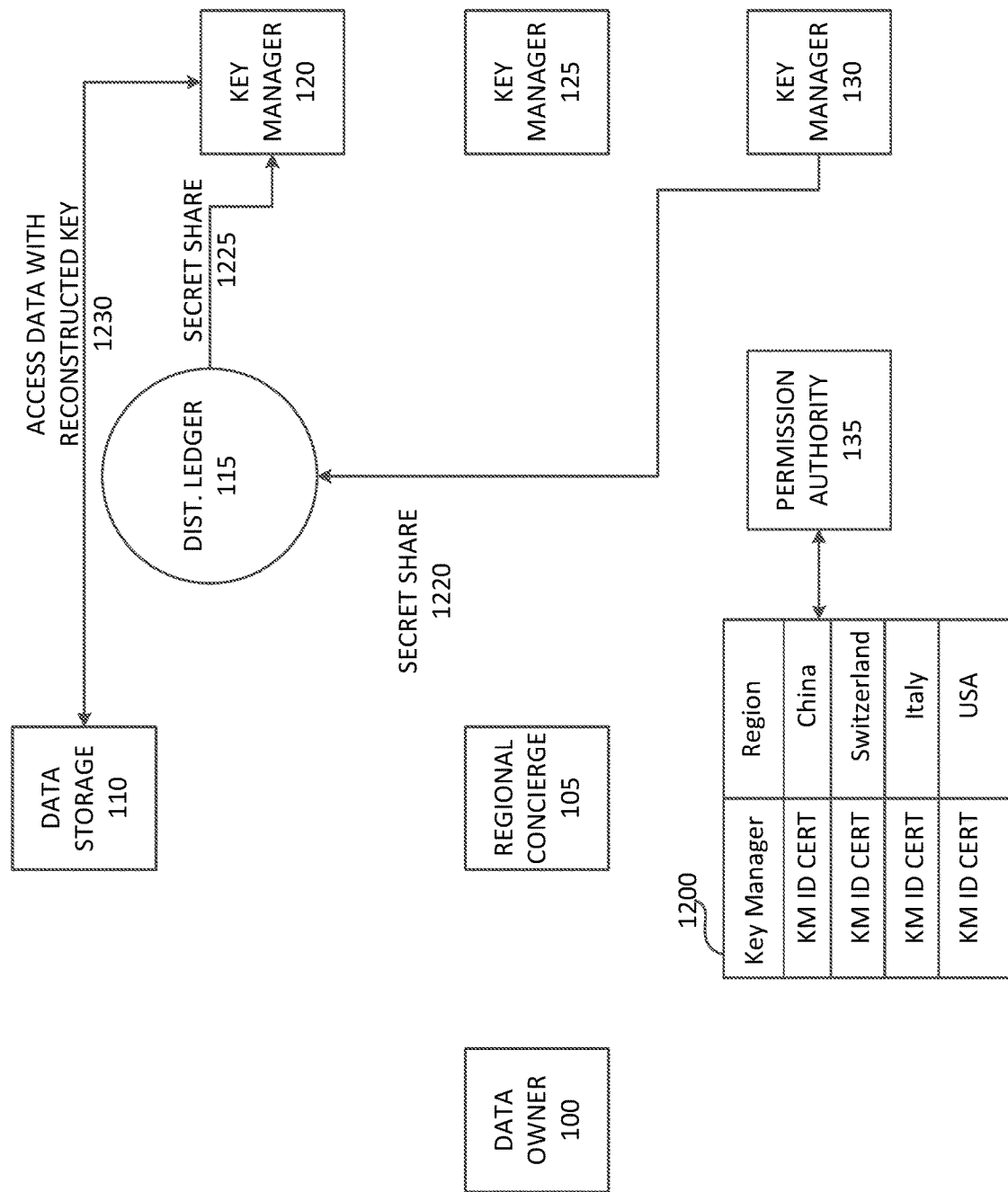
FIG. 12C is a further functional block diagram of an encryption management system according to exemplary aspects of the present disclosure.

In FIG. 12C, the key manager 130 determines, based on the response from the permission authority after consulting the regional identity register 1200, that the key request can be accepted. Therefore, the key manager 130 sends a response to the key request at 1220. The response includes the secret share of the key manager 130 and is signed with the identity certificate of the key manager 130. Of course, the response may include the MCP view of the key manager 130 instead of its secret share as discussed above. The response from the key manager 130 is uploaded to the distributed ledger 115, as described above, while maintaining the anonymity of the key manager 130.

The key manager 120 monitors the distributed ledger 115 for any responses to its key request. Therefore, the key manager 120 can detect that a response has been uploaded, though it cannot determine that the response was uploaded by the key manager 130. The key manager 120 then downloads the response at 1225, verifies its authenticity using the identity certificate with which the response is signed, and extracts the secret share, or MPC view, as the case may be. The key manager 120 then determines whether it is possible to recover the encryption key from information included in the response and, if so, recovers the encryption key and accesses the data stored in the data storage 110 at 1230.

If the key manager 120 is unable to recover the encryption key using the received response, the key manager may destroy the received response after a predetermined period of time, or may maintain the response for a predetermined period of time to see if another response is uploaded that can be used to recover the encryption key in conjunction with the response that the key manager 120 has already received.

Figure 13:
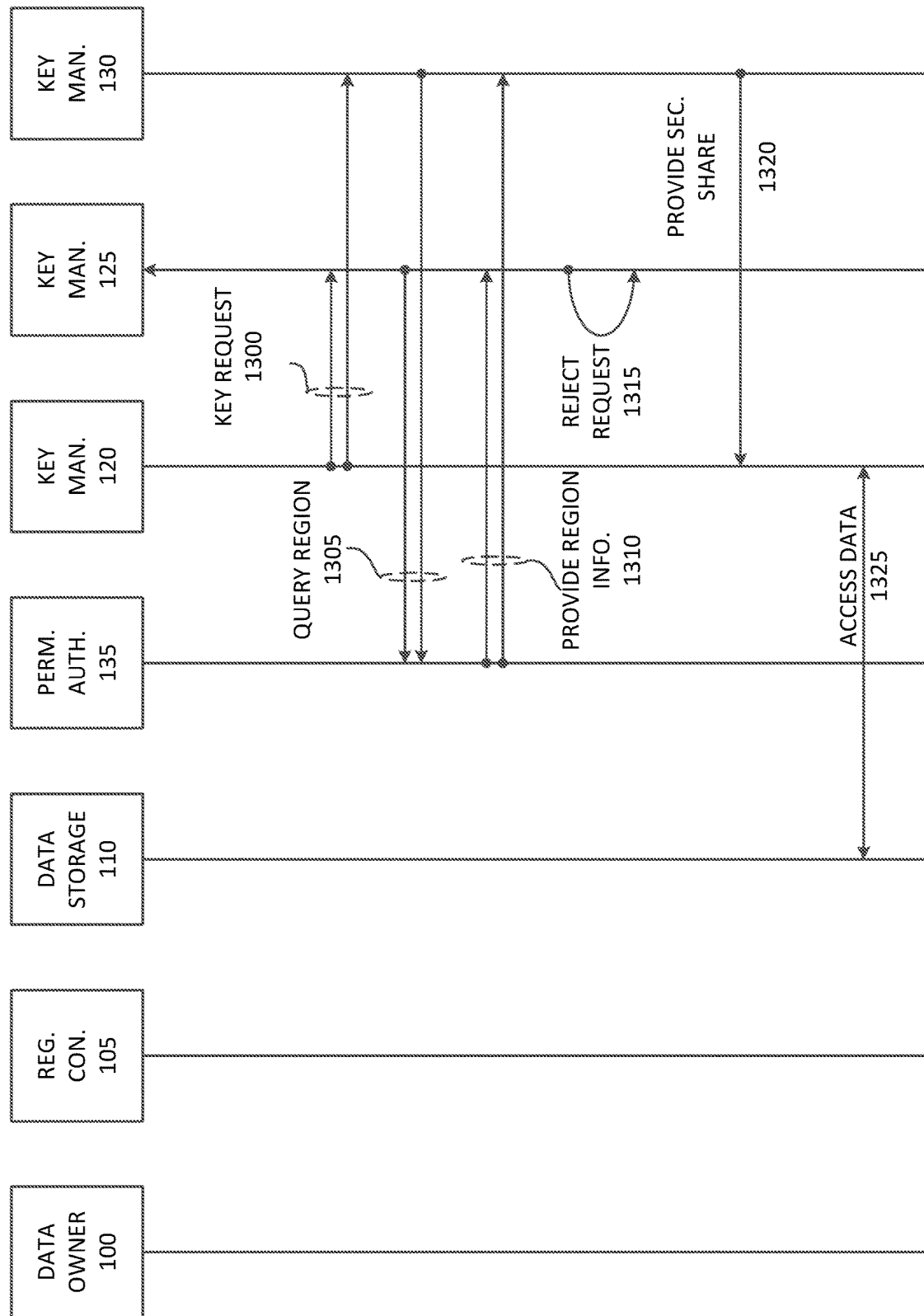
FIG. 13 is a communication process diagram according to exemplary aspects of the present disclosure.

Next the communication exchange corresponding to FIGS. 12A-12C is explained with reference to FIG. 13. In FIG. 13, the key manager 120 sends a key request at 1300 by uploading the key request to the distributed ledger 115, as described above. The key managers 125 and 130 download the key request from the distributed ledger 115 and query the permission authority 135 at 1305 to determine whether the key request originated in a region to which access to the data in data storage 110 can be permitted. As explained above, the queries from the key managers 125 and 130 may include the identity certificate includes in the request in order to allow the permission authority 135 to verify the location of a corresponding entity by consulting the regional identity register 1200.

After consulting the regional identity register 1200, the permission authority 135 responds to the key managers 125 and 130 at 1310. The response of the permission authority 135 may include the region from which the key request originated, or may include a directive instructing the key managers 125 and 130 to accept or deny the key request. The response from the permission authority 135 may be sent via the distributed ledger 115, the network 140, or another communication channel as would be recognized by one of ordinary skill in the art. The response may also be encrypted using any encryption method that is known, such as Rivest-Shamir-Adleman (RSA) encryption.

Based on the response from the permission authority, the key manager 1315 determines that the key request should be denied and takes no further action. Key manager 130 determines that the key request should be accepted and response to the request by uploading its secret share to the distributed ledger 115 at step 1320. As explained above, the response from the key manager 130 may include its MPC view instead of its secret share.

The key manager 120 determines that a response has been uploaded to the distributed ledger 115 and downloads the response. The key manager 120 then determines that the encryption key can be recovered based on the information included in the response, and recovers the encryption key. At 1325, the key manager 120 accesses the data stored in the data storage 110 using the encryption key.

Next, the process performed by key managers that receive a key request, such as key managers 125 and 130, is described with reference to FIG. 14. Because the process performed by the key manager that sends a key request, such as key manager 120, is substantially the same as the processes described above, further description is omitted for the sake of brevity.

Figure 14:
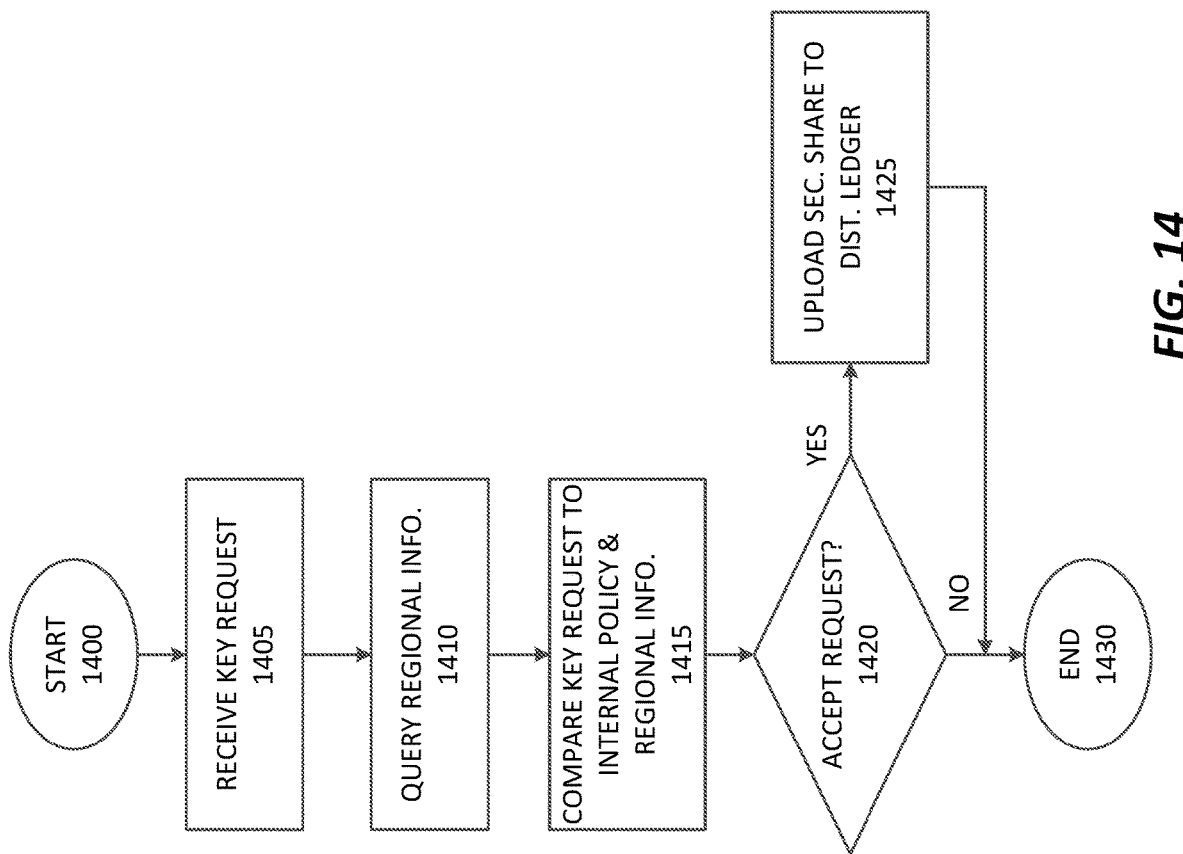
FIG. 14 is an algorithmic flowchart of a process performed by a computing device according to exemplary aspects of the present disclosure.

The process in FIG. 14 begins at step 1400 and proceeds to step 1405 where the key manager receives a key request. As noted above, the request is received anonymously via the distributed ledger 115 and is signed by an identity certificate of the sender, which authenticates the key request without divulging the identity of the sender.

At step 1410, the key manager queries the permission authority for regional information pertaining to the key request. At step 1415, the key manager compares the regional information received from the permission authority 135 with its internal policies to determine whether the key request can be accepted. As noted above, the internal policies of the key manager may dictate that the key request must original from a GDPR compliant region in order to be accepted. However, other regional and geographic based restrictions are also possible as one of ordinary skill would recognize.

At step 1420, the key manager either accepts or denies the key request. If the key manager accepts the key request, the process moves to step 1425 where it uploads its secret share to the distributed ledger 115 in a response to the key request. As explained above, the response is signed with the identity certificate of the key manger, but the identity of the key manager remains anonymous. The process ends at step 1430.

If at step 1420, the key manager denies the key request, the process moves to step 1430 where it ends. Note that no action on the part of the key manager is required after the key manager determines that the key request should be denied. However, in some exemplary aspects, the key manager may anonymously upload a notification of the denial to the distributed ledger 115.

Figure 15:
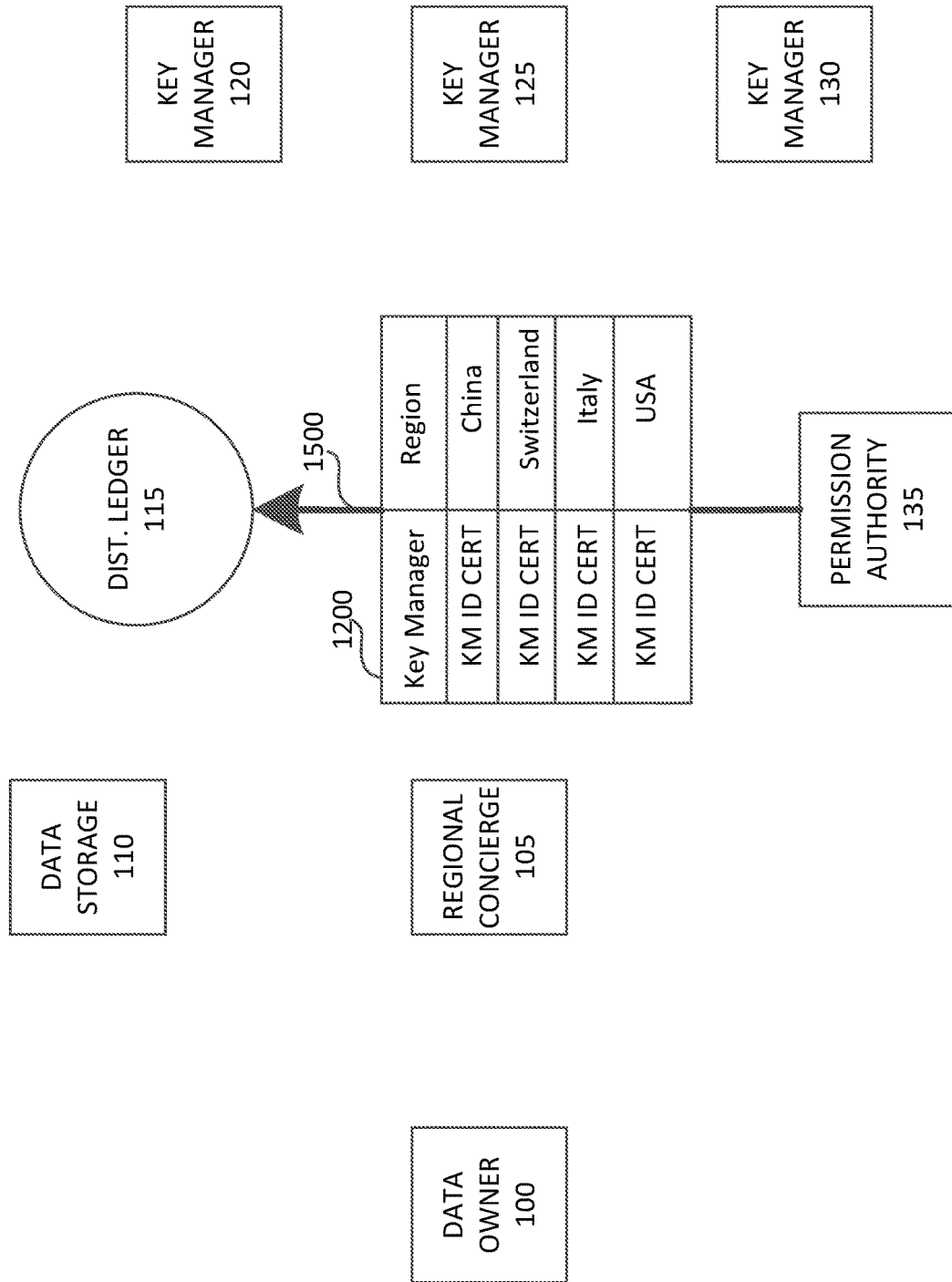
FIG. 15 is a functional block diagram of an encryption management system according to exemplary aspects of the present disclosure.

FIG. 15 illustrates other exemplary aspects of the present disclosure. In FIG. 15, the permission authority 135 uploads the regional identity register 1200 to the distributed ledger 115 at 1500. This eliminates the need for the key managers 120, 125, 130 to query the permission authority 135 regarding regional information since the information is now available on the distribute ledger 115. Because the regional identity register 1200 associates the identity certificates of the different key managers to their corresponding regions, the identities of the key managers are kept anonymous even though the regional identity register 1200 is placed on the distributed ledger 115.

In exemplary aspects, a permission authority for each region may be used. For example, in FIG. 16A there are three permission authorities 1600, 1605, 1610, each corresponding to a different region. Each of the permission authorities 1600, 1605, 1610 may correspond to a different country, a different continent, or to different regions within a country. The permission authorities 1600, 1605, 1610 may also correspond to different corporate entities, or different subdivisions of a single corporate entity. Other variations are also possible without departing from the scope of the present disclosure.

Figure 16A:
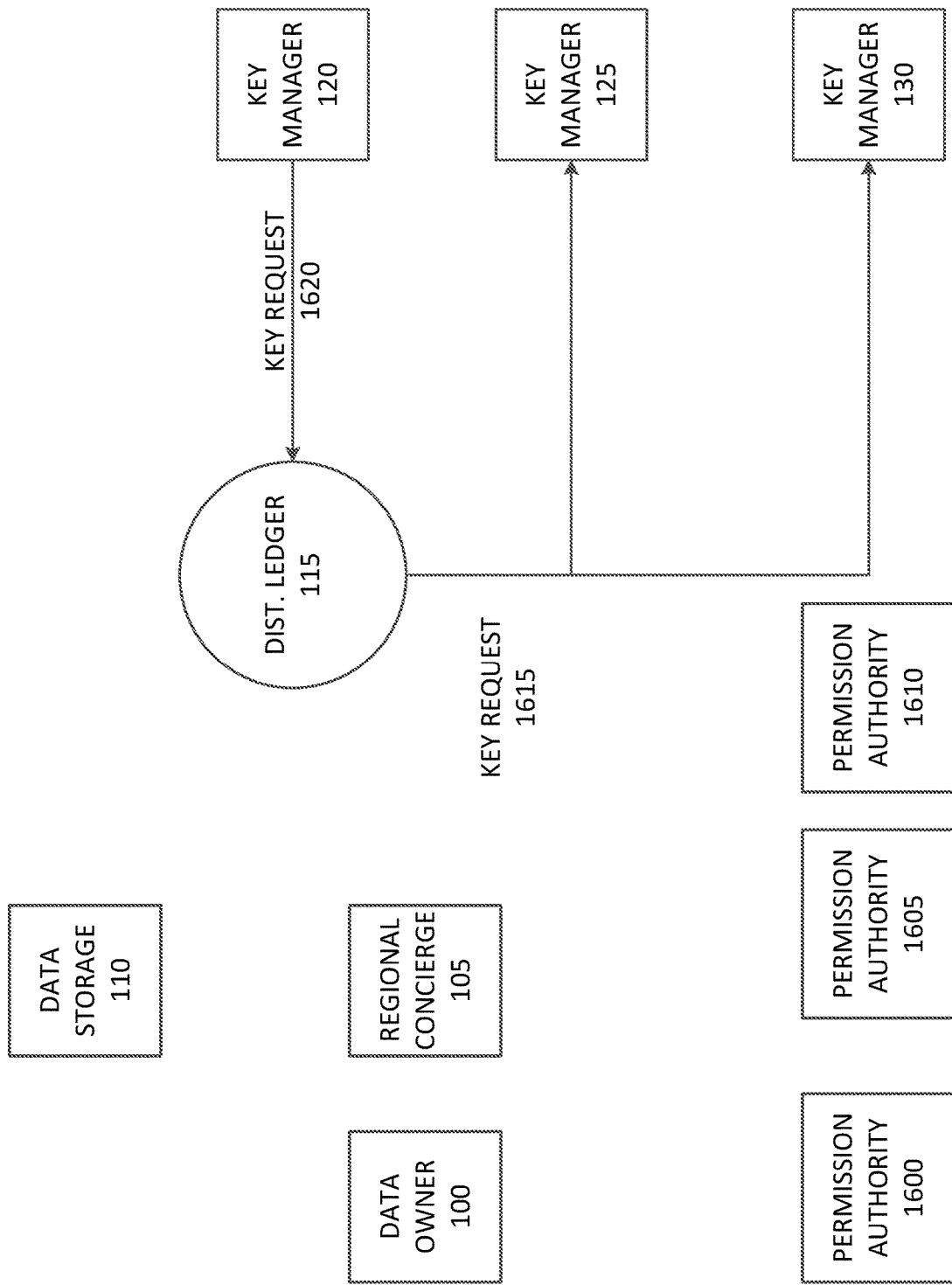
FIG. 16A is a functional block diagram of an encryption management system according to exemplary aspects of the present disclosure.
Figure 16B:
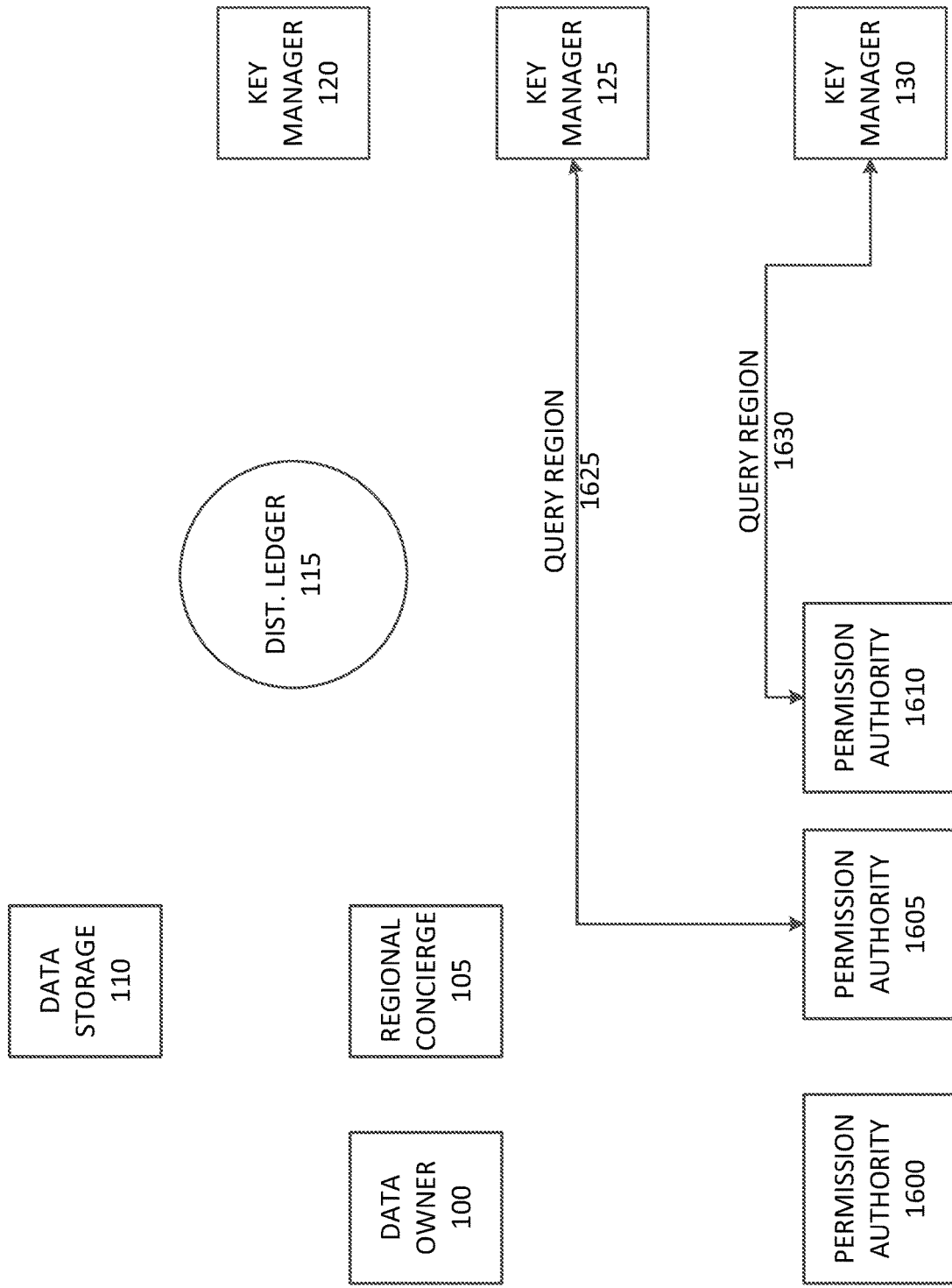
FIG. 16B is another functional block diagram of an encryption management system according to exemplary aspects of the present disclosure.

As in other exemplary aspects already explained, the key manager of FIG. 16A may upload a key request to the distributed ledger 115 at 1620, and the key request may be downloaded from the distributed ledger 115 by the key managers 125 and 130 at 1615. The key managers 125 and 130 may then query their corresponding permission authorities using, for example, the identity certificate included in the key request. Specifically, key manager 125 may query permission authority 1605 at 1625, and key manager 130 may query permission authority 1610 at 1630.

Figure 16C:
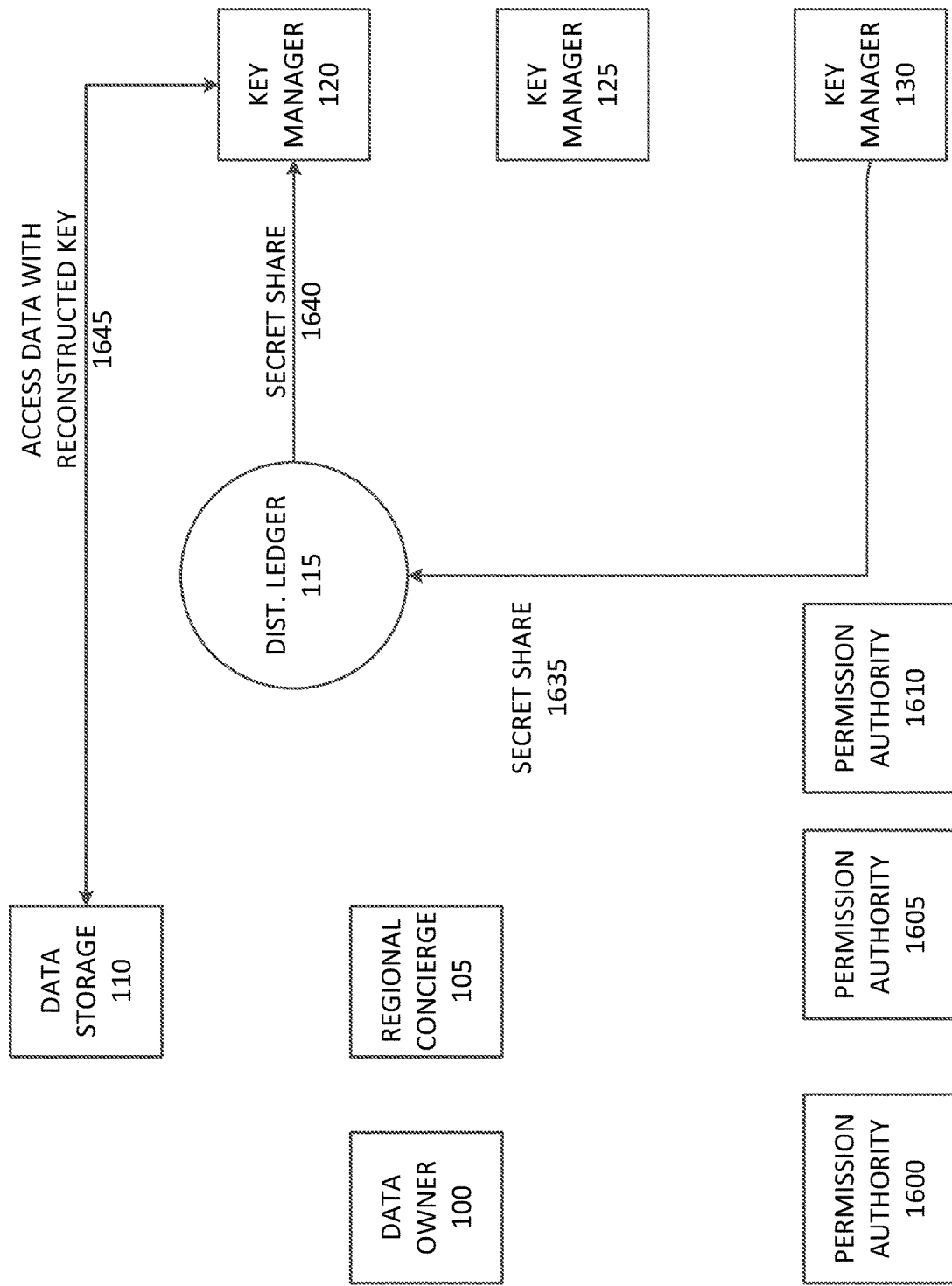
FIG. 16C is a further functional block diagram of an encryption management system according to exemplary aspects of the present disclosure.

As illustrated in FIG. 16C, the key manager 125 denies the request based on the regional information provided by the permission authority 1605. However, the key manager 130 accepts the key request based on the regional information obtained from the permission authority 1610. Therefore, the key manager 130 responses to the key request by anonymously uploading its secret share to the distributed ledger 115 at 1635. The specifics of uploading a response to the distributed ledger 115 and of maintaining the anonymity of the key manager 130 have been described above, and therefore not discussed further here. The key manager 120 downloads the response including the secret share of the key manager 130 at 1640, reconstructs the encryption key, and accesses the data stored in the data storage 110 at 1645.

In exemplary aspects, it may be advantageous to guard against a situation where one of the key managers is a bad actor. For example, a key manager may attempt to recover the encryption key under falsely pretenses, such as claiming an emergency. A key manager may also launch a denial of service (DoS) attack on the system by repeatedly sending bogus key requests. To identify a bad-acting key manager and punish the key manager by, for example, revoking the key manager's rights as a key manager, the permission authority 135 may maintain a certificate revocation list (CRL) 1700 associating the identity certificates of the key managers 120, 125, 130 with a corresponding status, i.e., good or revoked.

Figure 17A:
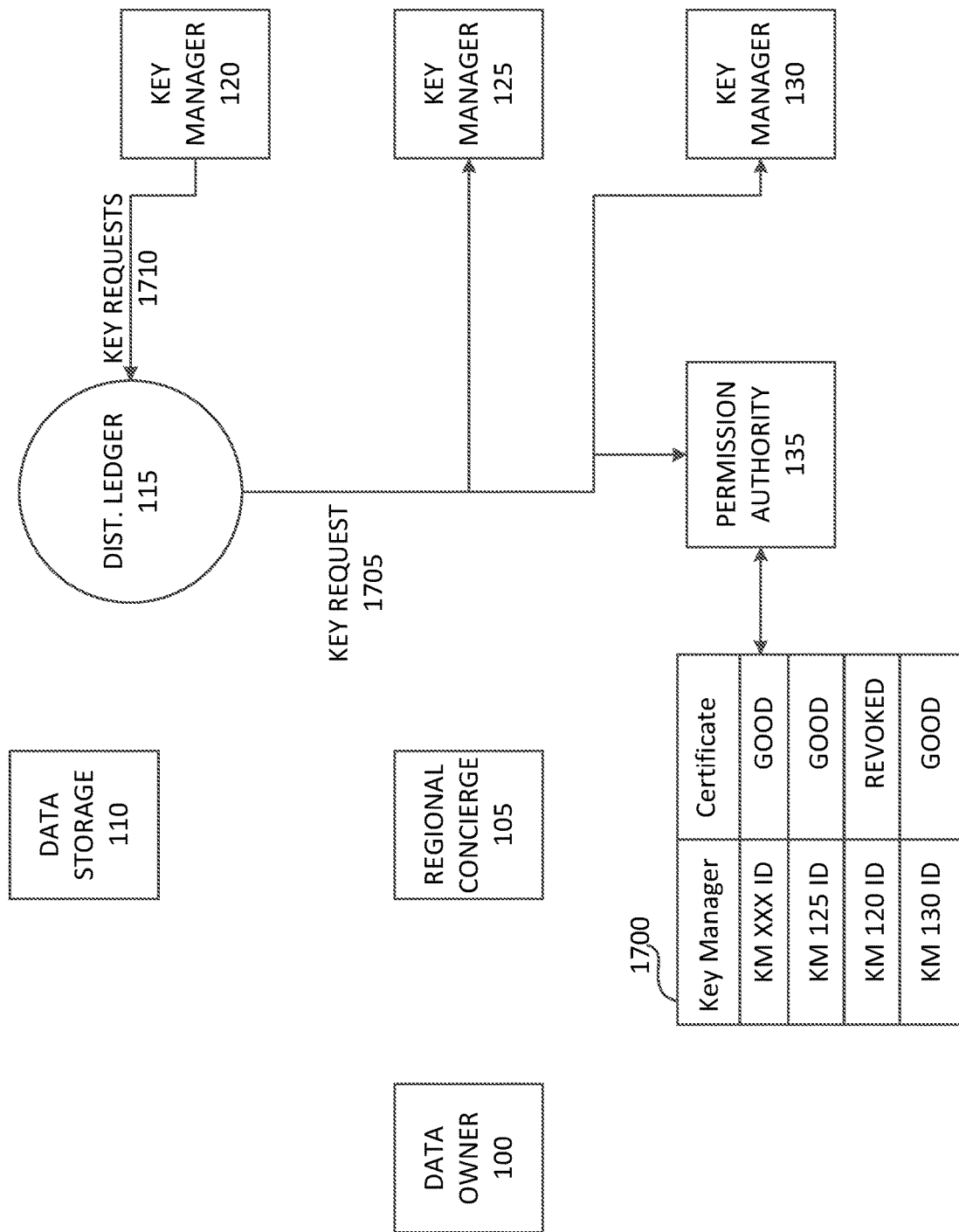
FIG. 17A is a functional block diagram of an encryption management system according to exemplary aspects of the present disclosure.

In FIG. 17A, the key manager 120 uploads multiple key requests at 1710 as part of a DoS attack to the distributed ledger 115. The permission authority 133 and the key managers 125 and 130 download the requests from the distributed ledger 115 at 1705. The permission authority 135 may then determine that the requests are bogus and part of a DoS attack by comparing the number of request per unit time to a threshold and/or by analyzing the contents of the requests. Once the permission authority 135 determines that the requests from the key manager 120 are fraudulent, the permission authority is able to compare the identity certificate with which the requests were signed to the CRL 1700 and revoke the identity certificate of the key manager 120 that sent the fraudulent requests.

Figure 17B:
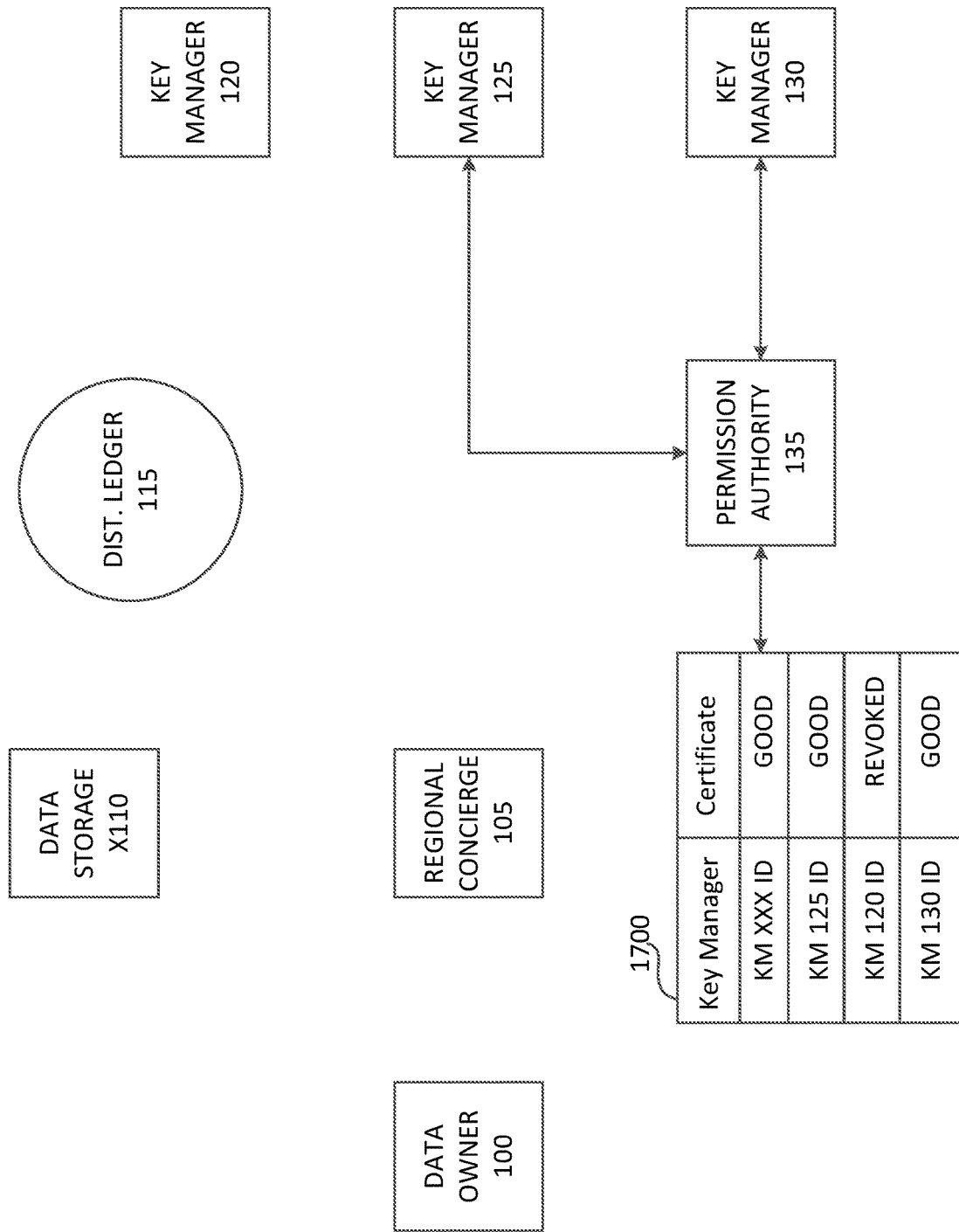
FIG. 17B is another functional block diagram of an encryption management system according to exemplary aspects of the present disclosure.
Figure 17C:
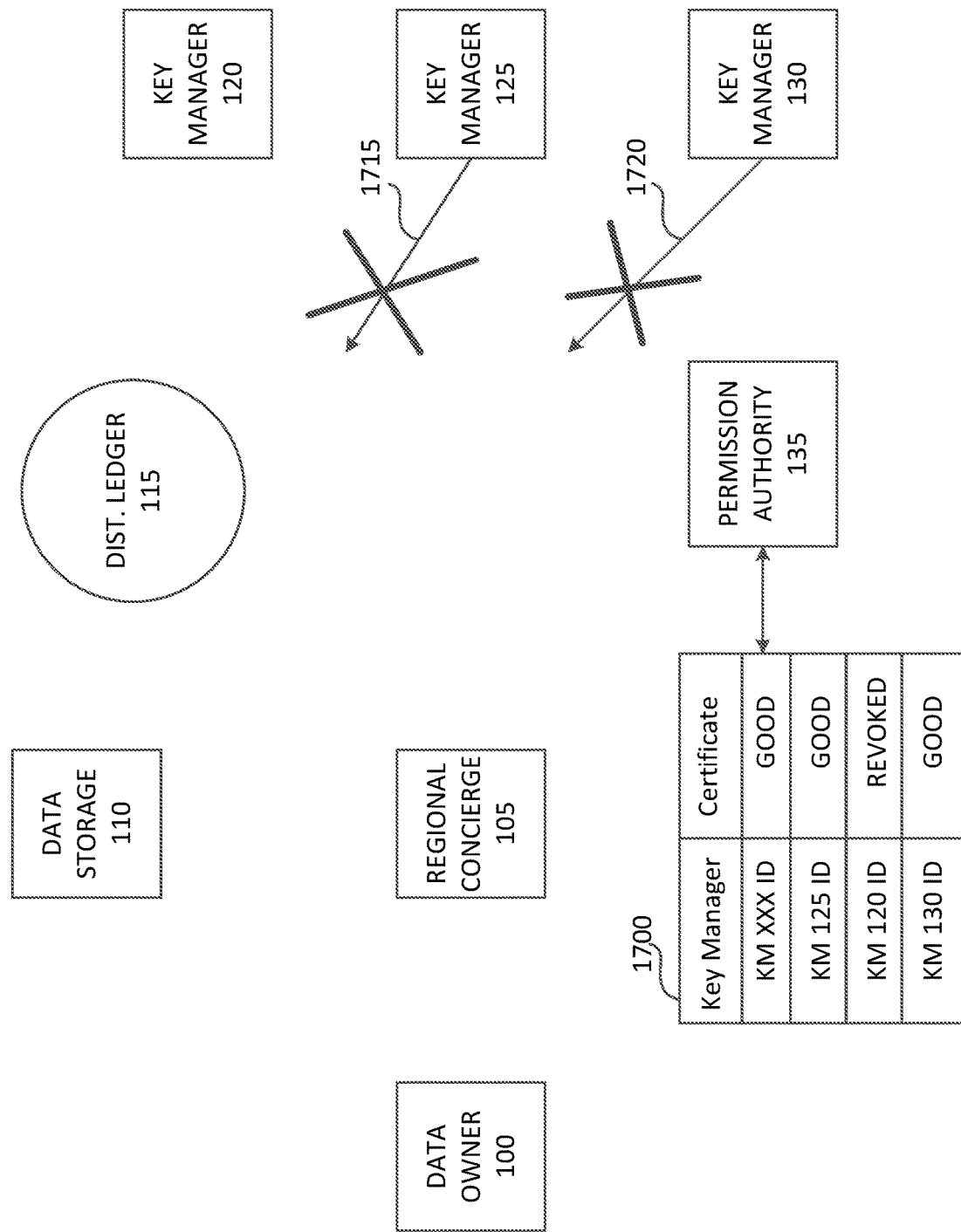
FIG. 17C is a further functional block diagram of an encryption management system according to exemplary aspects of the present disclosure.

In FIG. 17B, the key managers 125 and 130 query the permission authority using, for example, the identity certificate corresponding to the key requests downloaded from the distributed ledger 115. The permission authority 135 may then compare the identity certificates from the queries of the key managers 125 and 130 to the CRL 1700 and determine that the identity certificate has been revoked. The permission authority then notifies this information to the key managers 125 and 130, and the key managers 125 and 130 deny the requests as illustrated in FIG. 17C.

Figure 18:
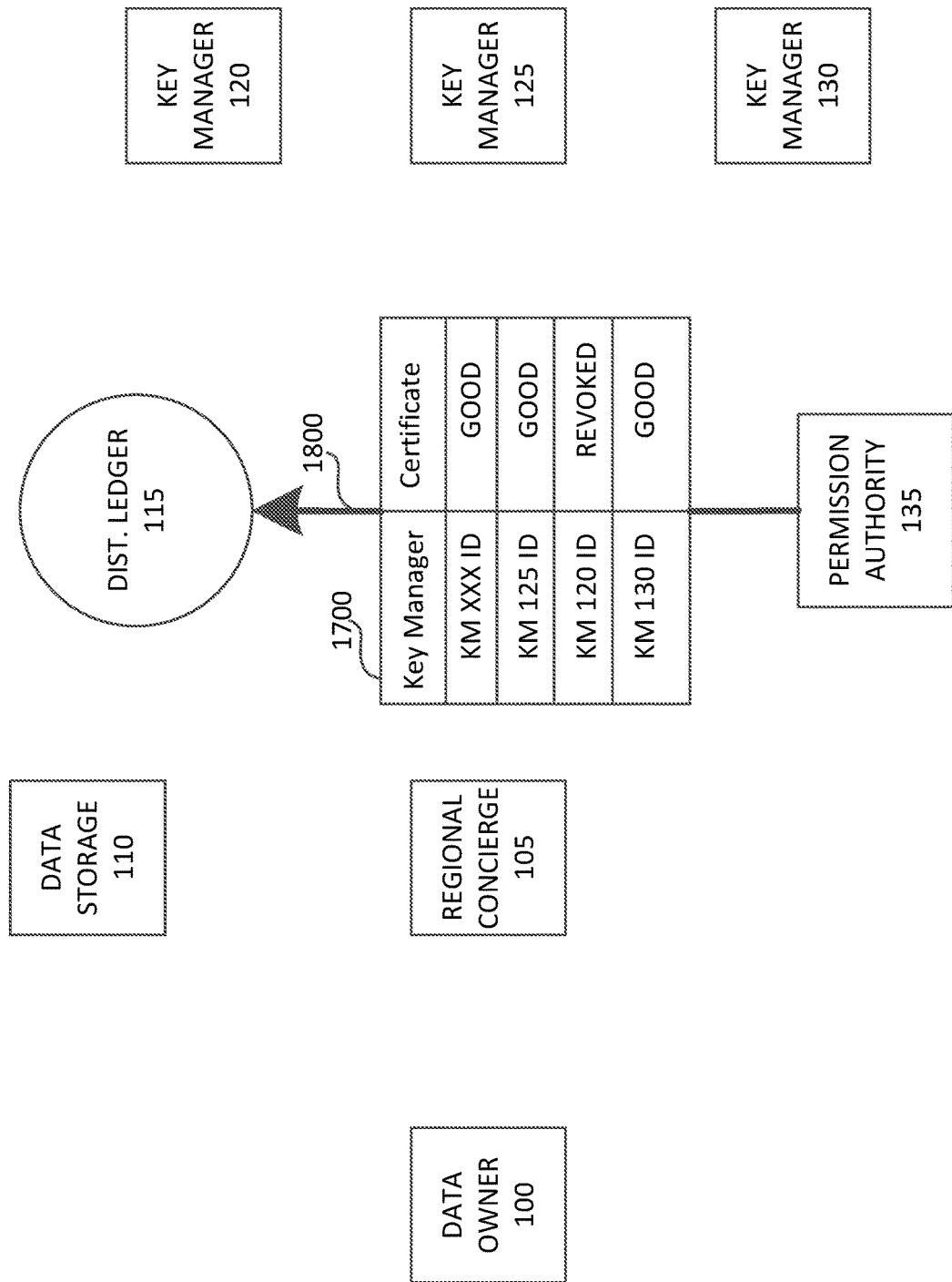
FIG. 18 us a functional block diagram of an encryption management system according to exemplary aspects of the present disclosure.

As illustrated in FIG. 18, the permission authority 135 may upload the CRL 1700 to the distributed ledger 115. In this case, the key managers 120, 125, 130 do not need to directly query the key manger 135. Instead, the key managers 120, 125, 130 are able to download the CRL 1700 from the distributed ledger 115 and perform their own comparison of identity certificates corresponding to received key requests and the CRL 1700.

As can be appreciated, the permission authority in FIG. 18 may upload new versions of the CRL 1700 to the distributed ledger 115 every time there is a change in identity certificate status for one of the key managers 120, 125, 130, every time a new key manager is added, every time a key manager is removed, or periodically. The permission authority may also upload multiple CRLs 1700 each corresponding to a different encryption key, a different geographic region, a different corporation, or combinations thereof.

In certain aspects, it may be advantageous to provide the encryption key to a regional authority 1900, for example a government agency such as the police, without forcing the regional authority to obtain the secret shares of the key managers 120, 125, 130 to recover the key.

Figure 19:
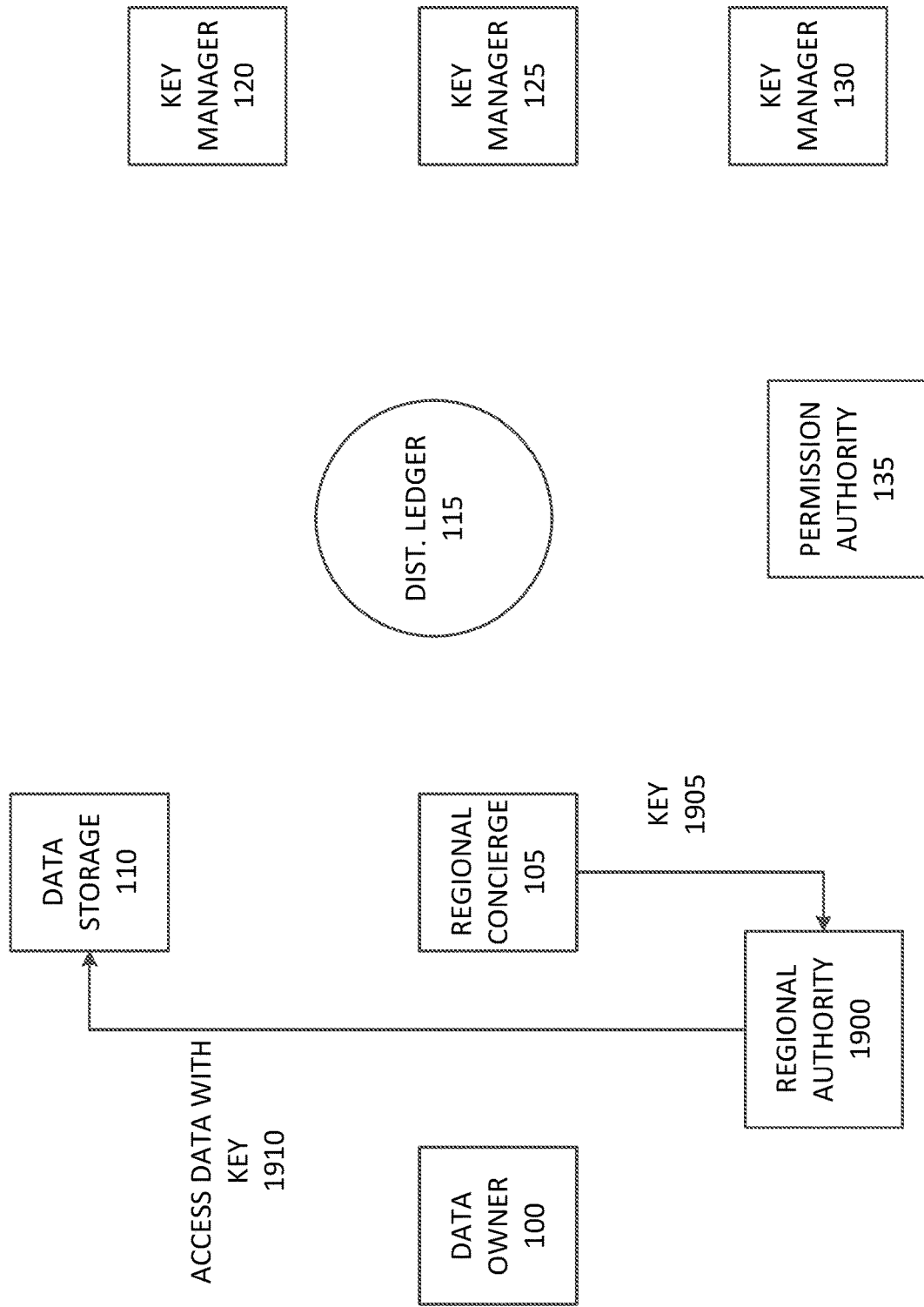
FIG. 19 is a functional block diagram of an encryption management system according to exemplary aspects of the present disclosure.

FIG. 19 illustrates an exemplary aspect of the present disclosure in which the regional concierge 105 does not destroy the encryption key after encrypting the data stored in the data storage 110 and distributing the secret shares to the key managers 120, 125, and 130. Upon presentation of the necessary credentials to establish the authenticity of the regional authority 1900 to the regional concierge 105, the regional concierge 105 may provide the encryption key to the regional authority 1900 at 1905. The regional authority 1900 may then access the data stored in the data storage 110 with the encryption key at 1910.

Alternatively, the regional concierge 105 may lock the encryption key in a key safe 2000. For example, the encryption key may itself be encrypted with a key and stored in the key safe. The regional concierge may then provide the key to access the encryption key to the regional authority 1900 once the regional authority presents the necessary credentials.

Figure 20:
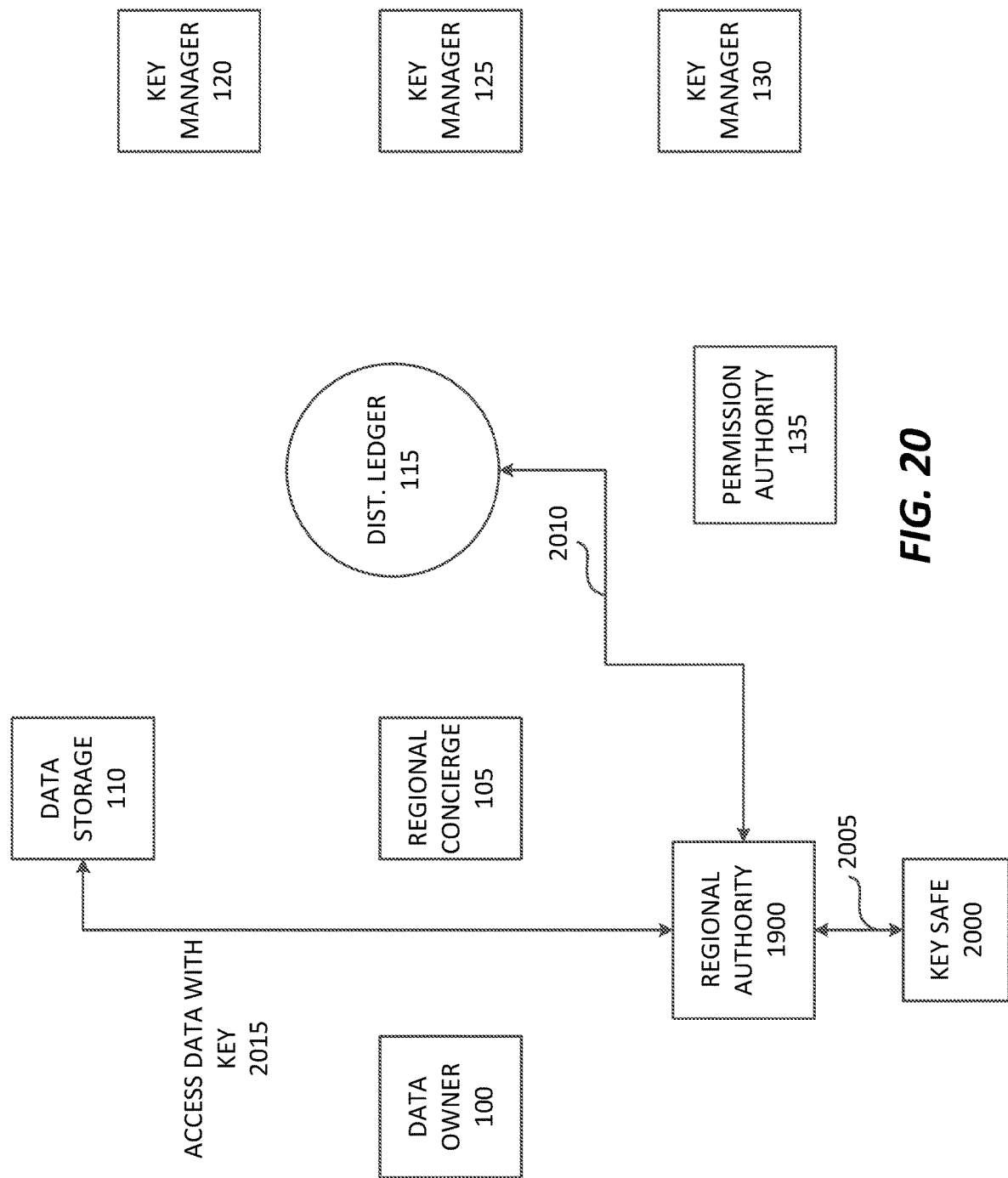
FIG. 20 is a functional block diagram of an encryption management system according to exemplary aspects of the present disclosure.

Alternatively, as illustrated in FIG. 20, the regional concierge 105 may place the key in a smart contract and upload the smart contract to the distributed ledger 115. This requires a distributed ledger that is capable of using smart contracts, such as Ethereum or other such ledgers. The regional authority 1900 may then access the key in the smart contract at 2010 using the required credentials or other information. With the key, the regional authority 1900 may access the encryption key in the key safe 2000 at 2005, and may use the encryption key to access the data in the data storage 110 at 2015.

Figure 21:
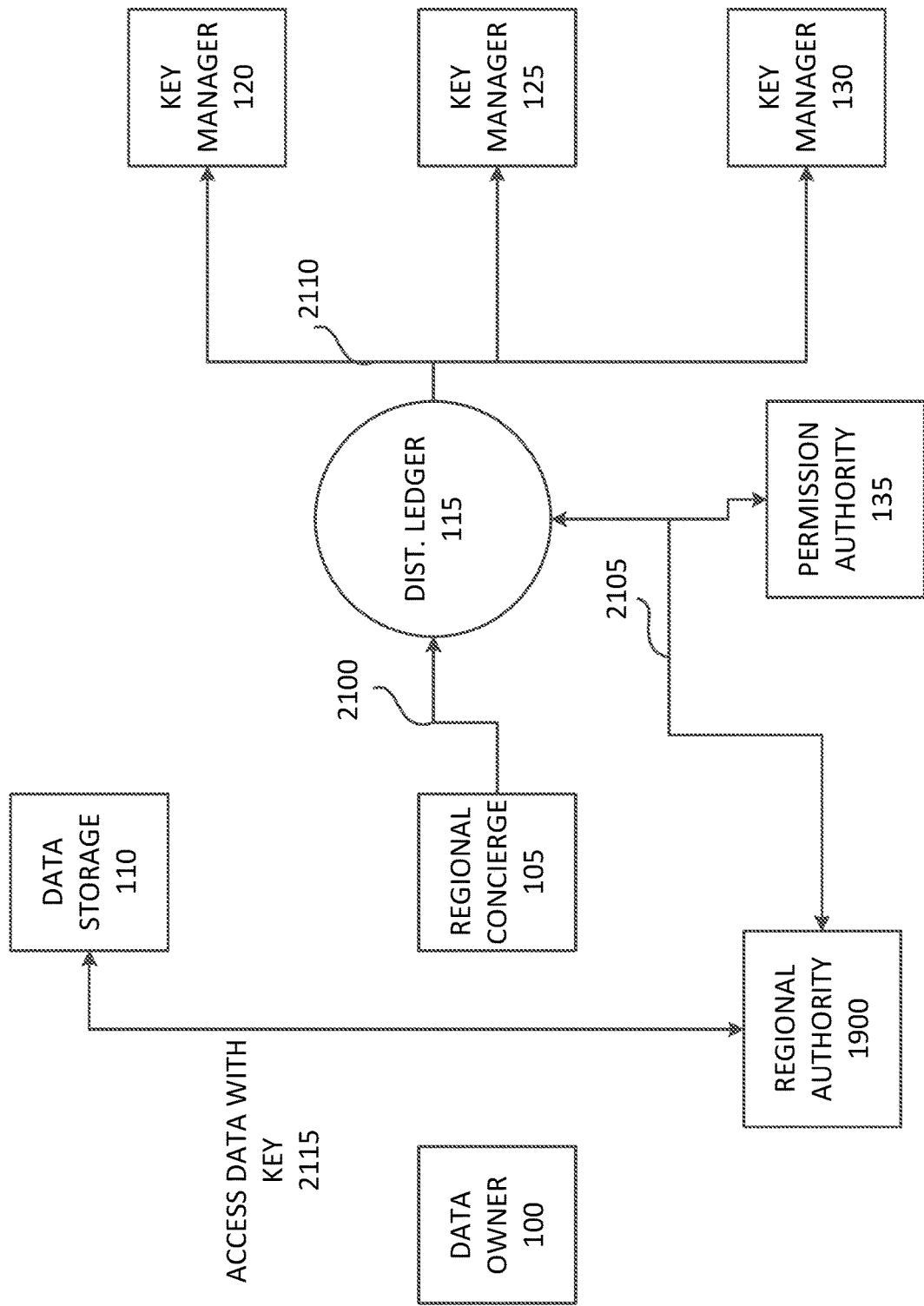
FIG. 21 is a functional block diagram of an encryption management system according to exemplary aspects of the present disclosure.

In other aspects, the regional concierge 105 may place the encryption key directly in a smart contract and upload the smart contract to the distributed ledger 115, which is a distributed ledger such as Ethereum that is capable of using smart contracts (step 2100). This is illustrated in FIG. 21. The regional authority 1900 may then access the encryption key directly from the smart contract using the appropriate credentials and/or other information at 2105. Then the regional authority 1900 is able to access the data in the data storage 110 using the encryption key at 2115. At 2110 the regional concierge notifies the key managers 120, 125, and 130, as well as the permission authority 135, that the regional authority 1900 has accessed the data in the data storage 110. As can be appreciated, the regional concierge 105 may also notify the data owner 100 that the data in the data storage 110 has been accessed by the regional authority 1900.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for data security for a first device, comprising:
uploading a request to a distributed ledger without identifying the first device, the request being signed with a certificate that identifies the request as valid using a pseudonym of the first device, and the distributed ledger being monitored by a second device;
receiving, from the second device, a secret share in a multi-party computation view; and
determining whether secret shares, which include the secret share received from the second device and an additional secret share, are sufficient to reconstruct a key to use for cryptographic processing.

2. The method according to claim 1, further comprising:
reconstructing the key using the secret shares upon determining that the secret shares are sufficient to reconstruct the key.

3. The method according to claim 2, further comprising:
retrieving encrypted data from a data storage device using the key reconstructed from the secret shares.

4. The method according to claim 3, wherein the encrypted data is retrieved by decrypting the data with the key reconstructed from the secret shares.

5. The method according to claim 1, wherein
the uploading includes anonymously uploading the request to the distributed ledger.

6. The method according to claim 5, wherein the anonymously uploading includes uploading the request to the distributed ledger using The Onion Router (Tor).

7. The method according to claim 1, wherein the distributed ledger is a block chain.

8. The method according to claim 1, further comprising:
receiving the additional secret share from a server that manages the secret shares and the key.

9. The method according to claim 1, wherein the secret share received by the first device includes a signature based on a certificate of the second device from which the secret share is received.

10. The method according to claim 9, further comprising:
validating the secret shares secret share received based on the signature included therein.

11. The method according to claim 10, further comprising, as part of the validating, querying a server that manages device certificates to determine whether the signature included in the secret share is valid.

12. The method according to claim 10, further comprising, as part of the validating, determining validity of the secret share based on a list obtained from a distributed ledger and the signature included in the secret share.

13. The method according to claim 12, wherein
the list is a certificate revocation list, and
the determining determines the request to be invalid in response to a certificate with which the request is signed being indicated as invalid in the certificate revocation list.

14. The method according to claim 1, further comprising:
receiving an other request from an other device;
validating the other request based on internal policies of the first device; and
sending a first secret share to the other device when the other request is determined to be valid.

15. The method according to claim 14, further comprising:
using regional information to validate the other request; and
determining the other request to be invalid in response to the regional information indicating that the other device is not in a region where data encrypted by the key is accessible.

16. A first device, comprising:
processing circuitry configured to
upload a request to a distributed ledger without identifying the first device, the request being signed with a certificate that identifies the request as valid using a pseudonym of the first device, and the distributed ledger being monitored by a second device,
receive, from the second device, a secret share in a multi-party computation view, and
determine whether the secret shares, which include the secret share received from the second device and an additional secret share, are sufficient to reconstruct a key to use for cryptographic processing.

17. The first device according to claim 16, wherein the processing circuitry is configured to
reconstruct the key using the secret shares upon determining that the secret shares are sufficient to reconstruct the key, and
retrieve encrypted data from a data storage device using the key reconstructed from the secret shares.

18. A non-transitory computer-readable storage medium including computer executable instructions, wherein the instructions, when executed by a first device, cause the first device to perform a method, the method comprising:
uploading a request to a distributed ledger without identifying the first device, the request being signed with a certificate that identifies the request as valid using a pseudonym of the first device, and the distributed ledger being monitored by a second device;
receiving, from the second device, a secret share in a multi-party computation view; and
determining whether the secret shares, which include the secret share received from the second device and an additional secret share, are sufficient to reconstruct a key to use for cryptographic processing.

19. The non-transitory computer-readable storage medium according to claim 18, further comprising:
reconstructing the key using the secret shares upon determining that the secret shares are sufficient to reconstruct the key; and
retrieving encrypted data from a data storage device using the key reconstructed from the secret shares.

20. The non-transitory computer-readable storage medium according to claim 18, further comprising:
receiving an other request from an other device;
validating the other request based on internal policies of the first device; and
sending a first secret share to the other device when the other request is determined to be valid.

* * * * *